United States Patent
Zhang et al.

(10) Patent No.: US 11,363,648 B2
(45) Date of Patent: Jun. 14, 2022

(54) COMMUNICATION METHOD AND RELATED DEVICE

(71) Applicant: Huawei Technologies Co., Ltd., Shenzhen (CN)

(72) Inventors: Hongping Zhang, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 16/673,636

(22) Filed: Nov. 4, 2019

(65) Prior Publication Data

US 2020/0068630 A1 Feb. 27, 2020

Related U.S. Application Data

(63) Continuation of application No. PCT/CN2018/085630, filed on May 4, 2018.

(30) Foreign Application Priority Data

May 5, 2017 (CN) .......................... 201710313985.7

(51) Int. Cl.
*H04W 76/10* (2018.01)
*H04W 76/27* (2018.01)
(Continued)

(52) U.S. Cl.
CPC ............. *H04W 76/10* (2018.02); *H04W 8/24* (2013.01); *H04W 36/0005* (2013.01); *H04W 72/048* (2013.01); *H04W 76/27* (2018.02)

(58) Field of Classification Search
CPC ....... H04W 76/10; H04W 76/27; H04W 8/24; H04W 36/0005; H04W 72/048;
(Continued)

(56) References Cited

U.S. PATENT DOCUMENTS

| | | | |
|---|---|---|---|
| 2009/0093280 | A1 | 4/2009 | Kitazoe |
| 2014/0242994 | A1 | 8/2014 | Xu et al. |
| 2019/0110190 | A1* | 4/2019 | Van Lieshout ....... H04L 67/303 |

FOREIGN PATENT DOCUMENTS

| | | |
|---|---|---|
| CN | 1964293 A | 5/2007 |
| CN | 1972282 A | 5/2007 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 14)," 3GPP TS 36.331, V14.2.2, XP051298184, Apr. 2017, 721 pages.

"UE Capability Principle and Signalling," Agenda Item: 10.2.2.7 NR—CP—Other, Source: Ericsson, Document for: Discussion, Decision, 3GPP TSG-RAN WG2 #97, Tdoc R2-1700907, Jan. 17-19, 2017, 4 pages.

(Continued)

*Primary Examiner* — Nam T Huynh
(74) *Attorney, Agent, or Firm* — Slater Matsil, LLP

(57) ABSTRACT

A communication method and a related device, the method including receiving a radio access capability of a terminal device, detecting whether a target radio access capability the same as the received radio access capability of the terminal device exists in a terminal device access capability set, where the terminal device access capability set is a set of radio access capability information corresponding to radio access capabilities, and, when the target radio access capability exists in the terminal device access capability set, indexing second access capability indication information in a context of the terminal device to radio access capability information corresponding to the target radio access capability.

6 Claims, 21 Drawing Sheets

(51) Int. Cl.
*H04W 8/24* (2009.01)
*H04W 36/00* (2009.01)
*H04W 72/04* (2009.01)

(58) Field of Classification Search
CPC ... H04W 28/02; H04W 28/0205; H04W 8/22; H04W 76/11
See application file for complete search history.

(56) References Cited

FOREIGN PATENT DOCUMENTS

| | | | |
|---|---|---|---|
| CN | 101370164 A | 2/2009 | |
| CN | 102739376 A | 10/2012 | |
| CN | 102740486 A | 10/2012 | |
| CN | 102932765 A | 2/2013 | |
| CN | 103188745 A | 7/2013 | |
| EP | 2071882 A2 | 6/2009 | |
| WO | 2010087569 A1 | 8/2010 | |

OTHER PUBLICATIONS

"Consideration on NR UE Capability," Agenda Item: 10.2.2.7, Source: Huawei, HiSilicon, Document for: Discussion and Decision, 3GPP TSG-RAN WG2#97, R2-1701852, Feb. 13-17, 2017, 3 pages.

"NR UE Capabilities, Size Reduction and Simplification," Agenda Item: 10.2.4.4, Source: Samsung, Document for: Discussion and Decision, 3GPP TSG-RAN WG2 Meeting #97bis, R2-1703254, Apr. 3-7, 2017, 6 pages.

"Reducing the Size of UE Capabilities," Agenda Item: 10.4.1.7, Source: Qualcomm Incorporated, WID/SID: NR_newRAT-Core—Release 15, Document for: Discussion and Decision, 3GPP TSG-RAN WG2 #97bis, R2-1703697, Apr. 3-7, 2017, 2 pages.

"UE Capability "Compression"," Agenda Item: 10.4.1.7, Source: Ericsson, Document for: Discussion and Decision, 3GPP TSG-RAN WG2 #97bis, Tdoc R2-1702722, Apr. 3-7, 2017, 2 pages.

* cited by examiner

COMMUNICATION METHOD AND RELATED DEVICE

CROSS-REFERENCE TO RELATED APPLICATIONS

This application is a continuation of International Application No. PCT/CN2018/085630, filed on May 4, 2018, which claims priority to Chinese Patent Application No. 201710313985.7, filed on May 5, 2017. The disclosures of the aforementioned applications are hereby incorporated by reference in their entireties.

TECHNICAL FIELD

The present invention relates to the field of communications technologies, and in particular, to a communication method and a related device.

BACKGROUND

In the mobile communications field, a radio access capability of a terminal device is an important factor for a base station to determine air interface configuration. Therefore, when the terminal device enters a connected mode, the base station performs air interface configuration based on the radio access capability of the terminal device. In a fourth-generation mobile communications technology, the radio access capability of the terminal device is stored by using a core network. After an RRC (radio resource control) connection between the terminal device and the base station is set up, the base station obtains the radio access capability of the terminal device from the core network. If the core network stores the radio access capability of the terminal device, the core network directly sends the radio access capability of the terminal device to the base station, to enable the base station to perform air interface configuration. If the core network does not store the radio access capability of the terminal device, the base station obtains the radio access capability of the terminal device from the terminal device again.

A current manner for obtaining the radio access capability of the terminal device consumes a relatively long time, leading to a long access delay and relatively low communication performance, and can no longer adapt to increasingly higher requirements of current users for communication quality.

SUMMARY

Embodiments of this application provide a communication method and a related device. An access network device can obtain a radio access capability of a terminal device as quickly as possible, to reduce an access delay, and improve communication performance.

A first aspect of this application provides a communication method. In a radio resource control RRC connection setup procedure, an access network device receives first access capability indication information of a terminal device, where the first access capability indication information is used to represent a radio access capability of the terminal device, and the access network device obtains the radio access capability of the terminal device according to the first access capability indication information.

In this technical solution, in the RRC connection setup procedure, the access network device can obtain or start to obtain the radio access capability of the terminal device, so that air interface configuration can be delivered more quickly, communication performance is improved, and an access delay is reduced.

In a first possible implementation of the first aspect, the access network device uses a radio access capability that corresponds to the first access capability indication information and that is in a first terminal device access capability set as the radio access capability of the terminal device according to the first access capability indication information.

In this technical solution, the access network device stores the radio access capability of the terminal device. An air interface only needs to transmit the first access capability indication information, and does not need to transmit the radio access capability, so that signaling overheads of the air interface are reduced.

With reference to the first aspect or the first possible implementation of the first aspect, in a second possible implementation of the first aspect, when the access network device does not store the radio access capability that corresponds to the first access capability indication information, the access network device requests the terminal device or a core network device for the radio access capability of the terminal device.

In this technical solution, in the RRC connection setup procedure, if determining that the radio access capability that corresponds to the first access capability indication information does not exist, the access network device may immediately initiate a process of requesting the terminal device or the core network device for the radio access capability of the terminal device, so that air interface configuration can be delivered more quickly, communication performance is improved, and an access delay is reduced.

With reference to the second possible implementation of the first aspect, in a third possible implementation of the first aspect, after requesting the terminal device for the radio access capability of the terminal device, the access network device receives terminal device access capability information sent by the terminal device, where the terminal device access capability information includes the radio access capability of the terminal device, and the access network device correspondingly adds the first access capability indication information of the terminal device and the radio access capability of the terminal device to the first terminal device access capability set.

In this technical solution, the access network device correspondingly adds the first access capability indication information of the terminal device and the radio access capability of the terminal device to the first terminal device access capability set, so that when the terminal device reenters a connected mode, the access network device can directly find, in the first terminal device access capability set, the radio access capability that is of the terminal device and that corresponds to the first access capability indication information without requesting the terminal device for the radio access capability, so that air interface configuration can be delivered more quickly, communication performance is improved, and an access delay is reduced.

With reference to the first possible implementation of the first aspect, in a fourth possible implementation of the first aspect, after using the radio access capability that corresponds to the first access capability indication information and that is in the first terminal device access capability set as the radio access capability of the terminal device, the access network device sends a first message to the core network device, where the first message is used to indicate that the access network device has obtained the radio access capability of the terminal device.

In this technical solution, the access network device has obtained the radio access capability of the terminal device, and the core network device does not need to send the radio access capability of the terminal device to the access network device, so that signaling overheads are reduced.

With reference to the second possible implementation of the first aspect, in a fifth possible implementation of the first aspect, after requesting the core network device for the radio access capability of the terminal device, the access network device receives a third message from the core network device, and when the third message carries the radio access capability of the terminal device, the access network device correspondingly adds the first access capability indication information of the terminal device and the radio access capability of the terminal device to the first terminal device access capability set.

In this technical solution, the access network device correspondingly adds the first access capability indication information of the terminal device and the radio access capability of the terminal device to the first terminal device access capability set, so that when the terminal device reenters a connected mode, the access network device can directly find, in the first terminal device access capability set, the radio access capability that is of the terminal device and that corresponds to the first access capability indication information without requesting the terminal device for the radio access capability, so that air interface configuration can be delivered more quickly, communication performance is improved, and an access delay is reduced.

With reference to the first aspect or any one of the first to fifth possible implementations of the first aspect, in a sixth possible implementation of the first aspect, the first access capability indication information of the terminal device includes terminal device model information or a radio access capability identifier.

With reference to the first aspect or any one of the first to sixth possible implementations of the first aspect, in a seventh possible implementation of the first aspect, when it is determined to perform access network device handover on the terminal device, the access network device sends a fourth message carrying the first access capability indication information to a target access network device.

In this technical solution, the access network device sends the fourth message carrying the first access capability indication information to the target access network device, only needs to transmit the first access capability indication information, and does not need to transmit the radio access capability, so that signaling overheads are reduced.

With reference to the first aspect or any one of the first to seventh possible implementations of the first aspect, in an eighth possible implementation of the first aspect, the first access capability indication information is carried by an RRC connection request message or an RRC connection setup complete message.

A second aspect of this application provides another communication method. A terminal device obtains first access capability indication information of the terminal device, and in a radio resource control RRC connection setup procedure, the terminal device sends the first access capability indication information of the terminal device to an access network device, where the first access capability indication information is used to represent a radio access capability of the terminal device.

In this technical solution, in the RRC connection setup procedure of the access network device, the terminal device sends the first access capability indication information of the terminal device to the access network device, and the access network device can obtain or start to obtain the radio access capability of the terminal device, so that air interface configuration can be delivered more quickly, communication performance is improved, and an access delay is reduced.

In a first possible implementation of the second aspect, when a radio access capability corresponding to the first access capability indication information does not exist in a first terminal device access capability set, the terminal device receives a terminal device access capability request from the access network device.

With reference to the second aspect or the first possible implementation of the second aspect, in a second possible implementation of the second aspect, the first access capability indication information of the terminal device includes terminal device model information or a radio access capability identifier.

A third aspect of this application provides another communication method. A core network device receives a second message from an access network device, where the second message carries first access capability indication information of a terminal device, and the first access capability indication information is used to represent a radio access capability of the terminal device, and the core network device obtains the radio access capability of the terminal device according to the first access capability indication information of the terminal device.

In a first possible implementation of the third aspect, the core network device uses a radio access capability that corresponds to the first access capability indication information and that is in a second terminal device access capability set as the radio access capability of the terminal device according to the first access capability indication information, and the core network device sends the obtained radio access capability of the terminal device to the access network device.

With reference to the first possible implementation of the third aspect, in a second possible implementation of the third aspect, when the radio access capability that corresponds to the first access capability indication information does not exist in the second terminal device access capability set, the core network device instructs the access network device to request the terminal device for the radio access capability of the terminal device.

With reference to the second possible implementation of the third aspect, in a third possible implementation of the third aspect, after instructing the access network device to request the terminal device for the radio access capability of the terminal device, the core network device receives the radio access capability of the terminal device from the access network device, and the core network device correspondingly adds the first access capability indication information of the terminal device and the radio access capability of the terminal device to the second terminal device access capability set.

In this technical solution, the core network device correspondingly adds the first access capability indication information of the terminal device and the radio access capability of the terminal device to the second terminal device access capability set, so that when the terminal device reenters a connected mode, the core network device can directly find, in the second terminal device access capability set, the radio access capability that is of the terminal device and that corresponds to the first access capability indication information, so that the access network device can obtain the radio access capability of the terminal device as early as possible. In this way, air interface configuration can be delivered more quickly, communication performance is improved, and an access delay is reduced.

With reference to the third aspect or the first to third possible implementations of the third aspect, in a fourth possible implementation of the third aspect, the first access capability indication information of the terminal device includes terminal device model information or a radio access capability identifier.

A fourth aspect of this application provides another communication method. A network device receives a radio access capability of a terminal device, and detects whether a target radio access capability the same as the received radio access capability of the terminal device exists in a third terminal device access capability set, where the third terminal device access capability set is a set of radio access capability information corresponding to radio access capabilities, and when the target radio access capability exists in the third terminal device access capability set, indexes second access capability indication information in a context of the terminal device to radio access capability information corresponding to the target radio access capability.

In a first possible implementation of the fourth aspect, when the target radio access capability does not exist in the third terminal device access capability set, radio access capability information corresponding to the radio access capability of the terminal device is added to the third terminal device access capability set, and the second access capability indication information in the context of the terminal device is indexed to the added radio access capability information.

With reference to the fourth aspect or the first possible implementation of the fourth aspect, in a second possible implementation of the fourth aspect, a first access capability that has a byte stream the same as that of the radio access capability of the terminal device and that is in the third terminal device access capability set is determined as the target radio access capability.

In this technical solution, provided that radio access capabilities are the same, different terminal devices only need to store one radio access capability, and the context does not store the radio access capability of the terminal device, and instead, stores only the second access capability indication information for being indexed to the radio access capability of the terminal device, so that memory occupation of the access network device and the core network device by storage of the radio access capability of the terminal device can be reduced.

A fifth aspect of this application provides an access network device. The access network device includes a processor, a memory, and a communications interface. The processor is connected to the memory and the communications interface. For example, the processor may be connected to the memory and the communications interface by using a bus. The communications interface is configured to communicate with another network device. The memory is configured to store a radio access capability and the like. The processor is configured to perform some or all of the procedures of the first aspect.

A sixth aspect of this application provides another access network device, including a receiving module and a processing module. Optionally, a sending module is further included. The processing module is configured to implement the processor in the fifth aspect, and the sending module in combination with the receiving module is configured to implement the communications interface in the fifth aspect.

The access network device implements some or all of the methods in the first aspect by using the foregoing modules.

A seventh aspect of this application provides a storage medium. The storage medium stores program code. When run by a computing device, the program code performs the communication method provided by the first aspect or any implementation of the first aspect. The storage medium includes but is not limited to a flash memory, a hard disk drive (HDD), or a solid state drive (SSD).

An eighth aspect of this application provides a computer program product. When run by a computing device, the computer program product performs the communication method provided by the first aspect or any implementation of the first aspect.

A ninth aspect of this application provides a terminal device. The terminal device includes a processor, a memory, and a communications interface. The processor is connected to the memory and the communications interface. For example, the processor may be connected to the memory and the communications interface by using a bus. The communications interface is configured to communicate with another network device. The memory is configured to store a radio access capability and the like. The processor is configured to perform some or all of the procedures of the second aspect.

A tenth aspect of this application provides another terminal device, including a sending module and a processing module. Optionally, a receiving module is further included. The processing module is configured to implement the processor in the ninth aspect, and the sending module in combination with the receiving module is configured to implement the network interface in the ninth aspect. The terminal device implements some or all of the methods in the second aspect by using the foregoing modules.

An eleventh aspect of this application provides a storage medium. The storage medium stores program code. When run by a computing device, the program code performs the communication method provided by the second aspect or any implementation of the second aspect. The storage medium includes but is not limited to a flash memory, a hard disk drive (HDD), or a solid state drive (SSD).

A twelfth aspect of this application provides a computer program product. When run by a computing device, the computer program product performs the communication method provided by the second aspect or any implementation of the second aspect.

A thirteenth aspect of this application provides a core network device. The core network device includes a processor, a memory, and a communications interface. The processor is connected to the memory and the communications interface. For example, the processor may be connected to the memory and the communications interface by using a bus. The communications interface is configured to communicate with another network device. The memory is configured to store a radio access capability and the like. The processor is configured to perform some or all of the procedures of the third aspect.

A fourteenth aspect of this application provides another core network device, including a receiving module and a processing module. Optionally, a sending module is further included. The processing module is configured to implement the processor in the thirteenth aspect, and the sending module in combination with the receiving module is configured to implement the communications interface in the thirteenth aspect. The core network device implements some or all of the methods in the third aspect by using the foregoing modules.

A fifteenth aspect of this application provides a storage medium. The storage medium stores program code. When run by a computing device, the program code performs the communication method provided by the third aspect or any implementation of the third aspect. The storage medium includes but is not limited to a flash memory, a hard disk drive (HDD), or a solid state drive (SSD).

A sixteenth aspect of this application provides a computer program product. When run by a computing device, the computer program product performs the communication method provided by the third aspect or any implementation of the third aspect.

A seventeenth aspect of this application provides a network device. The network device includes a processor, a memory, and a communications interface. The processor is connected to the memory and the communications interface. For example, the processor may be connected to the memory and the communications interface by using a bus. The communications interface is configured to communicate with another network device. The memory is configured to store a radio access capability and the like. The processor is configured to perform some or all of the procedures of the fourth aspect.

An eighteenth aspect of this application provides another network device, including a receiving module and a processing module. The processing module is configured to implement the processor in the seventeenth aspect, and the receiving module is configured to implement the communications interface in the seventeenth aspect. The network device implements some or all of the methods in the fourth aspect by using the foregoing modules.

A nineteenth aspect of this application provides a storage medium. The storage medium stores program code. When run by a computing device, the program code performs the communication method provided by the fourth aspect or any implementation of the fourth aspect. The storage medium includes but is not limited to a flash memory, a hard disk drive (HDD), or a solid state drive (SSD).

A twentieth aspect of this application provides a computer program product. When run by a computing device, the computer program product performs the communication method provided by the fourth aspect or any implementation of the fourth aspect.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 4b-1 and FIG. 4b-2 are a schematic flowchart of another communication method according to an embodiment of this application;

FIG. 4c-1 and FIG. 4c-2 are a schematic flowchart of another communication method according to an embodiment of this application;

FIG. 5a-1 and FIG. 5a-2 are a schematic flowchart of another communication method according to an embodiment of this application;

FIG. 5b-1 and FIG. 5b-2 are a schematic flowchart of another communication method according to an embodiment of this application;

DETAILED DESCRIPTION OF ILLUSTRATIVE EMBODIMENTS

The following clearly describes the technical solutions in the embodiments of this application with reference to the accompanying drawings in the embodiments of this application.

Figure 1:
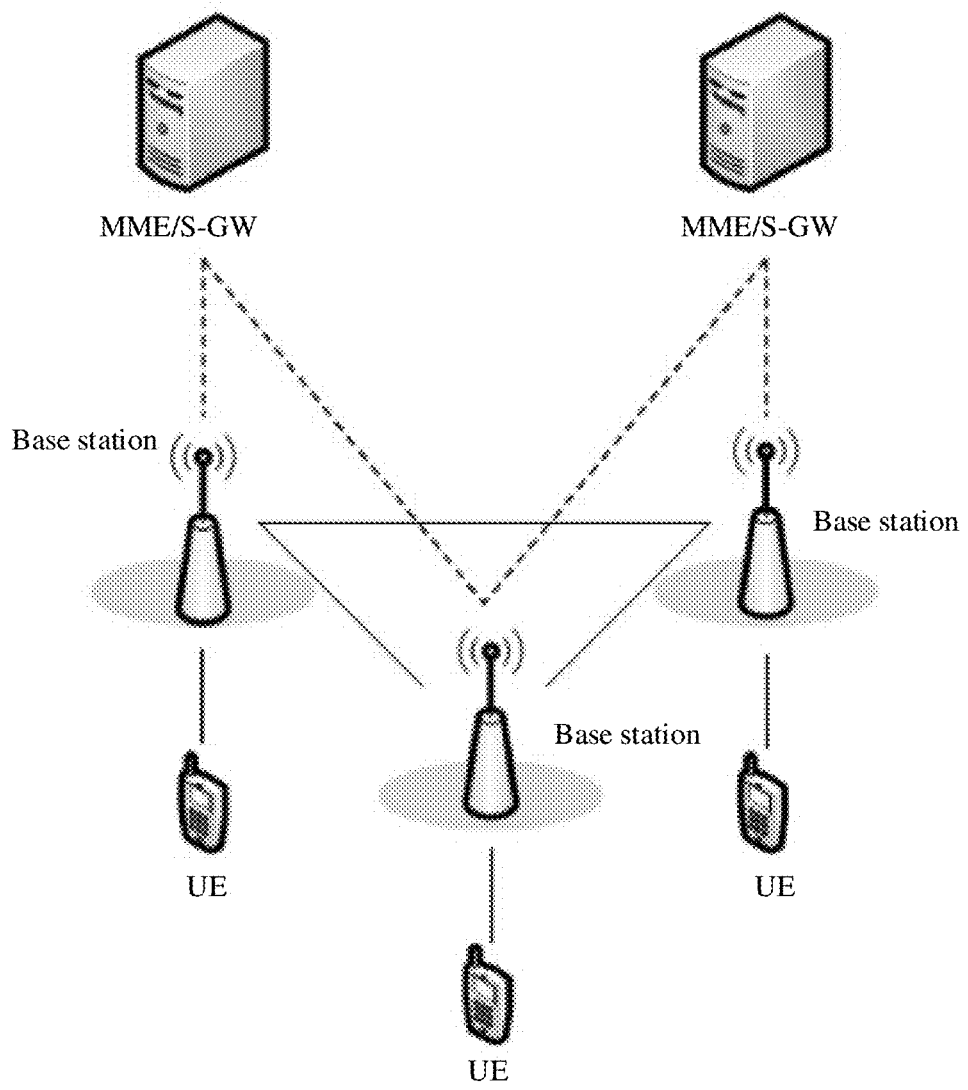
FIG. 1 is a schematic architectural diagram of a communications system according to an embodiment of this application.

FIG. 1 is a schematic architectural diagram of a communications system according to an embodiment of this application. Network elements and interfaces are described as follows.

A core network device may be a mobility management entity (MME)/serving gateway (S-GW), or a core network device in a future 5$^{th}$ generation (5G) system. The MME is a key control node in 3$^{rd}$ generation partnership project (3GPP) long term evolution (LTE), is a network element of a core network, and is mainly responsible for a signal processing part, that is, a control plane function, including functions such as an access control function, a mobility management function, attach and detach functions, a session management function, and a gateway selection function. The S-GW is an important network element of the core network in the 3GPP LTE, and is mainly responsible for a user plane function for forwarding user data, that is, routing and forwarding a data packet under control of the MME.

An access network device may be a base station. The base station may be an evolved NodeB (eNodeB, eNB) in a long term evolution (LTE) network, or a base station in the future 5G system, or the like. The access network device is mainly responsible for functions on an air interface side, such as a radio resource management function, a quality of service (QoS) management function, and data compression and encryption functions. Toward the core network side, the base station is mainly responsible for forwarding control plane signaling to the MME and forwarding user plane service data to the S-GW.

A terminal device may be user equipment (UE). The UE is a device that accesses a network side by using the base station in LTE, and for example, may be a handheld terminal device, a notebook computer, or another device that can access a network. The UE communicates with the base station by using an air interface technology. The air interface technology may include a $4^{th}$ generation (4G) (for example, FDD LTE or TDD LTE) system, a future forthcoming 5G system, and the like.

The communication method of this embodiment of the present invention is mainly applied to communication between the UE and the access network device and communication between the access network device and the core network device. For the 4G system, the access network device is the base station in the foregoing descriptions, and the core network device is the MME in the foregoing descriptions. For the 5G system, there may be different names, and this is not limited herein. It may be understood that FIG. 1 is merely an example, and this embodiment of this application is not limited thereto.

Figure 2A:
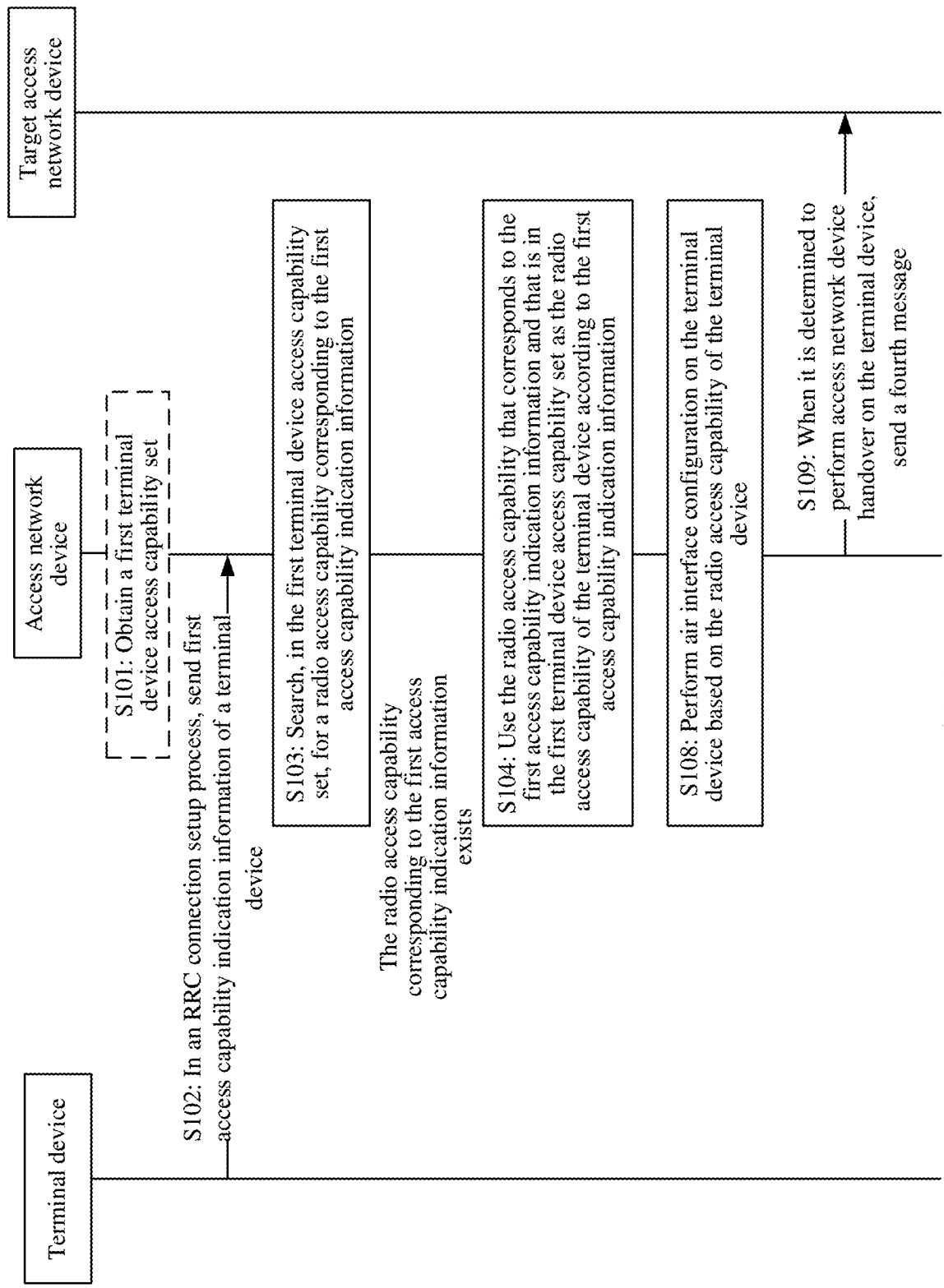
FIG. 2a is a schematic flowchart of a communication method according to an embodiment of this application.
Figure 2B:
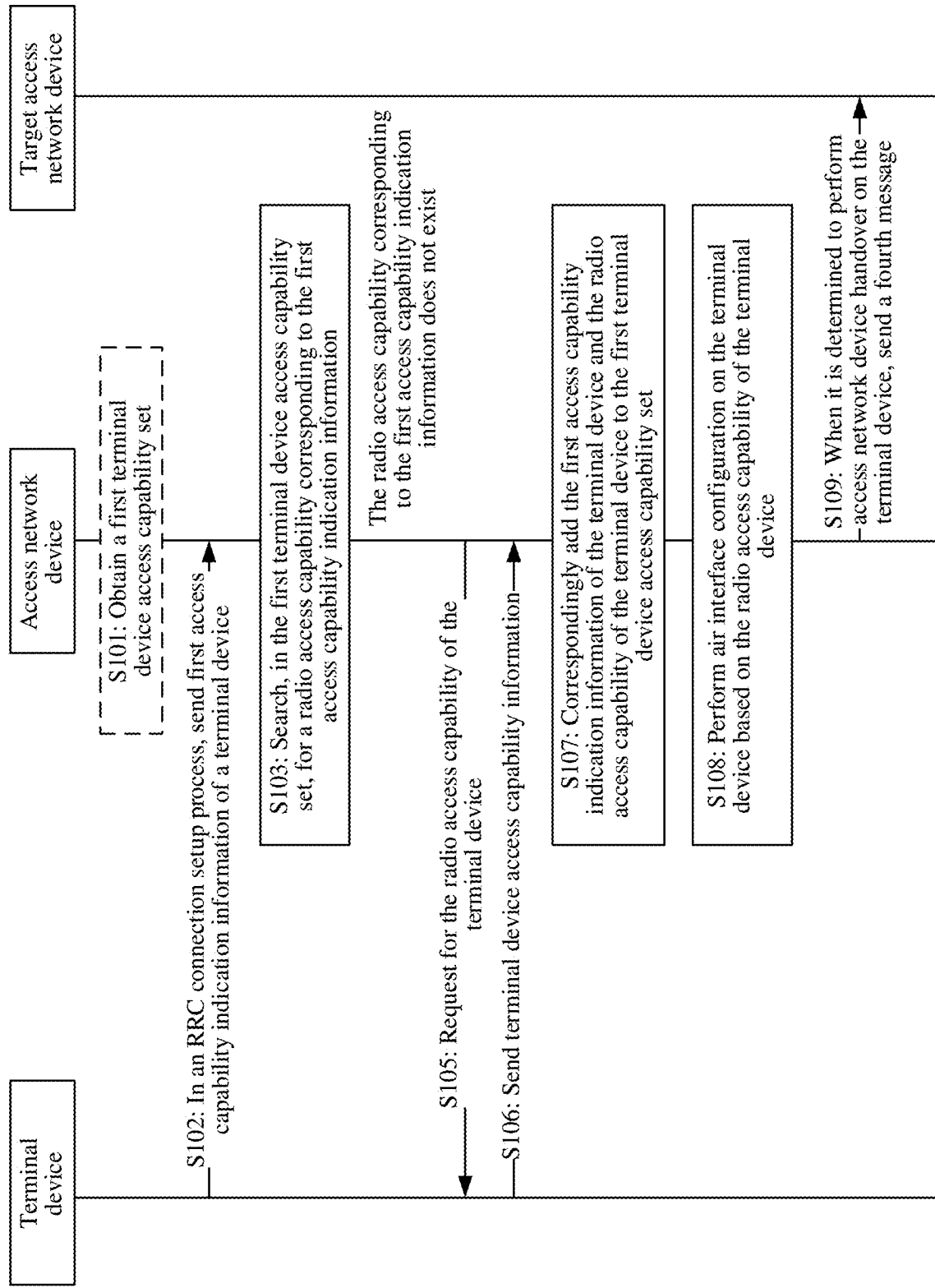
FIG. 2b is a schematic flowchart of another communication method according to an embodiment of this application.

Referring to FIG. 2a and FIG. 2b, an embodiment of this application provides a schematic flowchart of a communication method. In this embodiment, an access network device maintains and stores a radio access capability of a terminal device, and a core network device does not maintain and store the radio access capability of the terminal device. The method includes but is not limited to the following steps.

S102: In a radio resource control RRC connection setup procedure, the terminal device sends first access capability indication information of the terminal device to the access network device.

When entering a connected mode, the terminal device performs the RRC (Radio Resource Control, radio resource control) connection setup procedure with the access network device. For example, the terminal device first sends an RRC connection request message (RRC CONNECTION REQUEST) to the access network device, to request to establish an RRC connection. The access network device sends an RRC connection setup message (RRC CONNECTION SETUP) to the terminal device. After determining that the RRC connection is successfully set up, the terminal device sends an RRC connection setup complete message (RRC CONNECTION SETUP COMPLETE) to the access network device, so that the RRC connection setup procedure ends.

In the RRC connection setup procedure, the terminal device may send the first access capability indication information of the terminal device to the access network device. The first access capability indication information may be used to represent the radio access capability of the terminal device. To be specific, the access network device may determine, according to the first access capability indication information, the radio access capability of the terminal device that is indicated by the first access capability indication information.

Optionally, the first access capability indication information may be carried by the RRC connection request message or the RRC connection setup complete message. In other words, when sending the RRC connection request message or the RRC connection setup complete message to the access network device, the terminal device may carry the first access capability indication information in the RRC connection request message or the RRC connection setup complete message. Specifically, the first access capability indication information may be carried by a reserved bit in the RRC connection request message or the RRC connection setup complete message, or a bit may be added to the RRC connection request message or the RRC connection setup complete message to carry the first access capability indication information. This is not specifically limited herein.

The radio access capability of the terminal device is a capability related to a radio air interface of the terminal device, for example, a rate of the radio air interface, or a packet loss rate of the radio air interface.

During specific implementation, the first access capability indication information of the terminal device may be terminal device model information or a radio access capability identifier. The terminal device model information may include a product model of the terminal device and/or a software version number of the terminal device. The product model of the terminal device is a code marked on produced terminal devices of a same type and of different specifications by a manufacturer by using numerals or letters separately, to facilitate distinction. The software version number of the terminal device is a baseband version number in a communications chip of the terminal device. The radio access capability identifier is an identification code corresponding to the radio access capability, and may be an identifier formed by combining numerals, letters, symbols, or the like, for example, 123 or C1. This is not specifically limited in this embodiment.

After receiving the first access capability indication information of the terminal device, the access network device may obtain the radio access capability of the terminal device according to the first access capability indication information. In the embodiment shown in FIG. 2a and FIG. 2b, S103 may be specifically performed.

S103: The access network device searches, in a first terminal device access capability set, for a radio access capability corresponding to the first access capability indication information, and if the radio access capability corresponding to the first access capability indication information exists, performs S104, as shown in FIG. 2a, and if the radio access capability corresponding to the first access capability indication information does not exist, performs S105 to S107, as shown in FIG. 2b.

After receiving the first access capability indication information, the access network device may obtain the radio access capability of the terminal device with reference to the first terminal device access capability set.

The first terminal device access capability set is a set of access capability indication information and radio access capabilities corresponding to the access capability indication information. In other words, the first terminal device access capability set may include a plurality of radio access capabilities, and each radio access capability has corresponding access capability indication information.

It should be noted that when the access capability indication information is the terminal device model information, a plurality of different pieces of terminal device model information in the first terminal device access capability set may correspond to a same radio access capability, and when the access capability indication information is the radio access capability identifier, radio access capability identifiers in the first terminal device access capability set are in one-to-one correspondence to the radio access capabilities.

Optionally, the radio access capabilities stored in the first terminal device access capability set may be ASN.1 encoded byte streams, or be ASN.1 decoded radio access capabilities, or include both the ASN.1 encoded byte streams and the ASN.1 decoded radio access capabilities.

After receiving the first access capability indication information, the terminal device searches, in the first terminal device access capability set, for the radio access capability corresponding to the first access capability indication information. It is worth mentioning that a case in which the first terminal device access capability set is an empty set, in other words, the first terminal device access capability set does not store any radio access capability, is not excluded. Herein, the first terminal device access capability set may be set information maintained by the access network device.

For example, Table 1 and Table 2 may be tables of mapping relationships between the access capability indication information and the radio access capabilities in the first terminal device access capability set. The access capability indication information of Table 1 is the terminal device model information, and the access capability indication information of Table 2 is the radio access capability identifier.

TABLE 1

Table of mapping relationships between the access capability indication information (the terminal device model information) and the radio access capabilities

| Access capability indication information (terminal device model information) | Radio access capability |
|---|---|
| Product model 1 + software version number 1 | Radio access capability A |
| Product model 2 + software version number 2 | Radio access capability B |
| Product model 3 + software version number 3 | Radio access capability C |
| . . . | . . . |

TABLE 2

Table of mapping relationships between the access capability indication information (the radio access capability identifiers) and the radio access capabilities

| Access capability indication information (radio access capability identifier) | Radio access capability |
|---|---|
| C1 | Radio access capability A |
| C2 | Radio access capability B |
| C3 | Radio access capability C |
| . . . | . . . |

S104: The access network device uses the radio access capability that corresponds to the first access capability indication information and that is in the first terminal device access capability set as the radio access capability of the terminal device according to the first access capability indication information.

In this way, in the RRC connection setup procedure, the access network device can locally obtain the radio access capability of the terminal device, so that air interface configuration can be delivered more quickly, communication performance is improved, and an access delay is reduced. Further, when the access network device stores the radio access capability of the terminal device, an air interface only needs to transmit the first access capability indication information, and does not need to transmit the radio access capability, so that signaling overheads of the air interface are reduced.

As shown in FIG. 2a, after S104, S108 may be further performed.

S105: The access network device requests the terminal device for the radio access capability of the terminal device.

If the access network device does not find, in the first terminal device access capability set, the radio access capability that corresponds to the first access capability indication information, the access network device may request the terminal device for the radio access capability of the terminal device. For example, the access network device requests the terminal device by using a UE Capability Enquiry message, for requesting the terminal device to send the radio access capability of the terminal device to the access network device.

S106: The terminal device sends terminal device access capability information to the access network device.

The terminal device sends the terminal device access capability information (for example, UE Capability Information) to the access network device based on a received request for the radio access capability, and the terminal device access capability information includes the radio access capability of the terminal device. Optionally, the terminal device access capability information may further carry the first access capability indication information, so that the access network device correspondingly adds the first access capability indication information of the terminal device and the radio access capability of the terminal device to the first terminal device access capability set directly based on the terminal device access capability information.

Therefore, in the RRC connection setup procedure, if determining that the radio access capability that corresponds to the first access capability indication information does not exist, the access network device may immediately initiate a process of requesting the terminal device for the radio access capability of the terminal device, so that air interface configuration can be delivered more quickly, communication performance is improved, and an access delay is reduced.

S107: The access network device correspondingly adds the first access capability indication information of the terminal device and the radio access capability of the terminal device to the first terminal device access capability set.

After obtaining the radio access capability sent by the terminal device, the access network device may correspondingly add the first access capability indication information and the radio access capability of the terminal device to the first terminal device access capability set, in other words, complete an update of the first terminal device access capability set. In this way, when the terminal device reenters a connected mode, the access network device may directly find, in the first terminal device access capability set, the radio access capability that is of the terminal device and that corresponds to the first access capability indication information without requesting the terminal device for the radio access capability, so that air interface configuration can be delivered more quickly, communication performance is improved, and an access delay is reduced.

Optionally, the radio access capability sent by the terminal device may be an ASN.1 encoded byte stream, and the access network device may decode the byte stream. Therefore, the radio access capabilities stored in the first terminal device access capability set may be ASN.1 encoded byte streams or ASN.1 decoded radio access capabilities, so that the access network device can directly use the ASN.1 decoded radio access capabilities. Alternatively, both the ASN.1 encoded byte streams and the decoded radio access capabilities may be stored. This is not limited in this embodiment of this application.

It should be noted that there is no necessary sequence in which S106 and S107 are performed, and therefore this is not limited herein.

As shown in FIG. 2b, after S106 or S107, S108 may be performed.

S108: The access network device performs air interface configuration on the terminal device based on the radio access capability of the terminal device.

After obtaining the radio access capability of the terminal device, the access network device may perform air interface configuration, for example, configure a measurement configuration parameter or a handover parameter, based on the radio access capability of the terminal device.

Optionally, before S102, the access network device may perform S101.

S101: The access network device obtains the first terminal device access capability set.

After the access network device is powered on, the access network device may obtain an initial first terminal device access capability set by using an OSS (Operation Support System, operation support system).

Optionally, when the access network device needs to hand over the terminal device to a target access network device, this embodiment may further include the following.

S109: When it is determined to perform access network device handover on the terminal device, the access network device sends a fourth message carrying the first access capability indication information to the target access network device.

The access network device determines the target access network device to which the terminal device needs to be handed over, and sends the fourth message to the target access network device. The fourth message carries the first access capability indication information of the terminal device. After receiving the fourth message, the target access network device obtains the radio access capability that is of the terminal device and that corresponds to the first access capability indication information. Further, the fourth message may be a handover request message.

The embodiment shown in FIG. 2a and FIG. 2b is applicable to an implementation scenario in which the access network device maintains and stores the radio access capability of the terminal device, the core network device does not maintain and store the radio access capability of the terminal device, and the access network device does not delete the stored radio access capability of the terminal device as the terminal device enters an idle mode. To be specific, the access network device maintains and stores the first terminal device access capability set. The set is not for a particular terminal device, and is shared by UEs in the access network device. The embodiment shown in FIG. 2a and FIG. 2b is also applicable to another scenario in which the steps of this solution can be performed. This is not specifically limited herein.

Figure 3A:
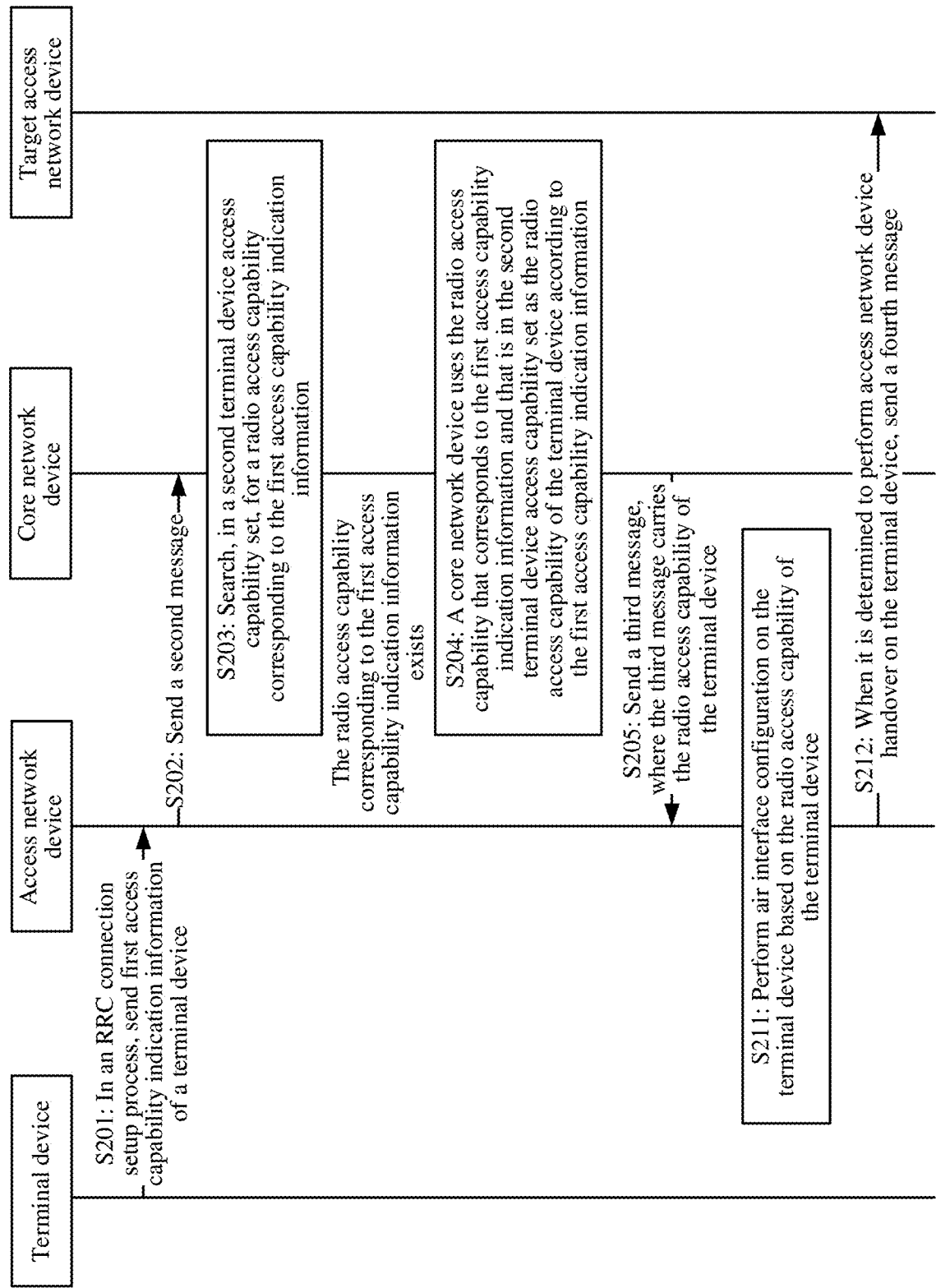
FIG. 3a is a schematic flowchart of another communication method according to an embodiment of this application.
Figure 3B:
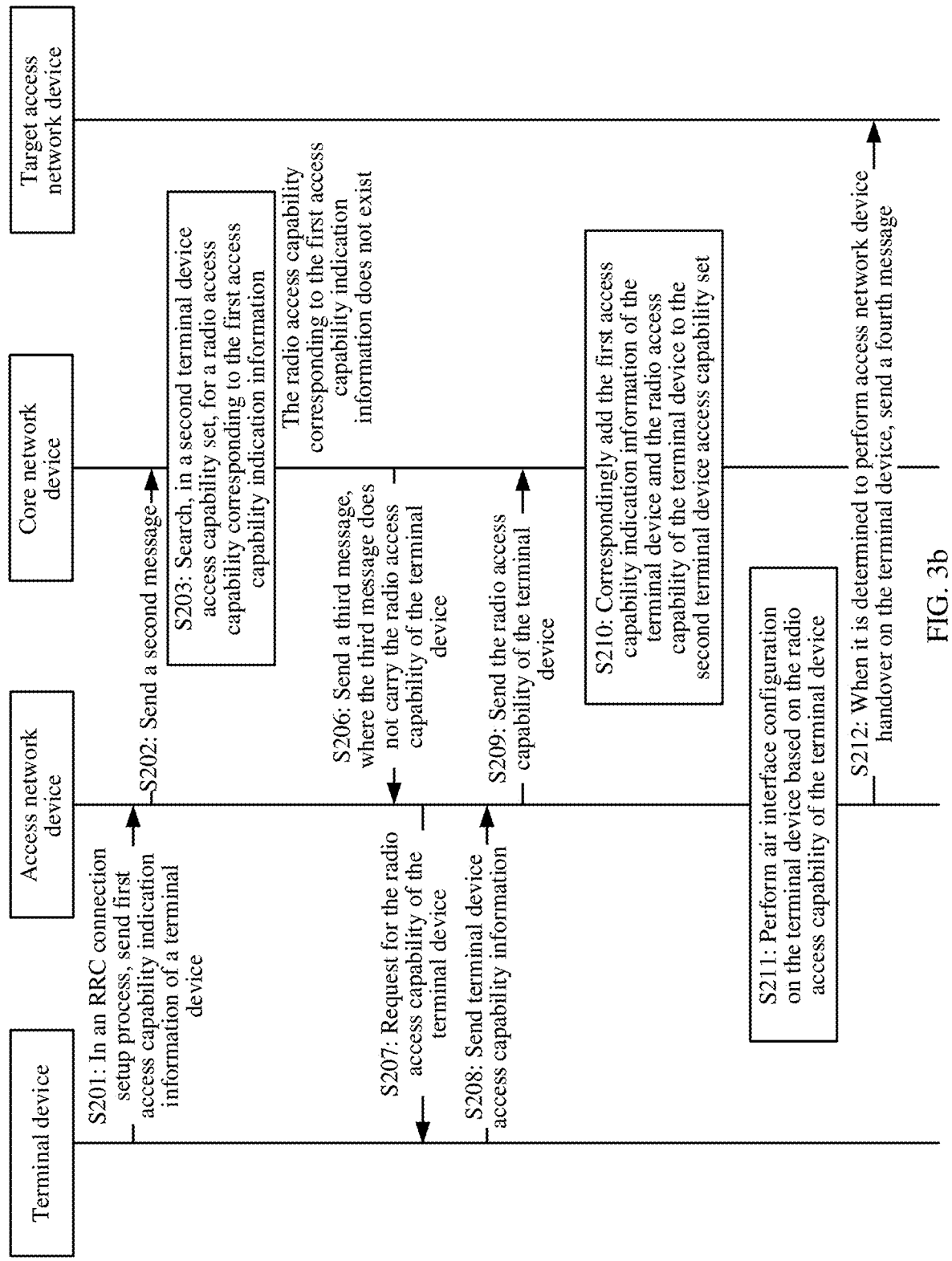
FIG. 3b is a schematic flowchart of another communication method according to an embodiment of this application.

Referring to FIG. 3a and FIG. 3b, an embodiment of this application provides a schematic flowchart of another communication method. In this embodiment, a core network device maintains and stores a radio access capability of a terminal device, and an access network device does not maintain and store the radio access capability of the terminal device (in an idle mode). The method includes but is not limited to the following steps.

S201: In a radio resource control RRC connection setup procedure, the terminal device sends first access capability indication information of the terminal device to the access network device.

Refer to S102 for a specific implementation of S201, and details are not described herein again.

S202: The access network device sends a second message to the core network device.

Because the access network device does not maintain and store the radio access capability of the terminal device in an idle mode, after receiving the first access capability indication information, the access network device sends the second message to the core network device, and the second message is used to request the core network device for the radio access capability of the terminal device.

In a possible implementation scenario, the second message may carry the first access capability indication information of the terminal device, for instructing the core network device to search for the corresponding radio access capability according to the first access capability indication information of the terminal device, and then send the radio access capability to the access network device. In another possible implementation scenario, the second message may not carry the first access capability indication information of the terminal device, and is only used for instructing the core network device to obtain the radio access capability of the terminal device.

Subsequent steps of this embodiment are further described by using an implementation scenario in which the second message carries the first access capability indication information of the terminal device as an example.

After receiving the second message of the access network device, the core network device may obtain the radio access capability of the terminal device according to the first access capability indication information. In the embodiment shown in FIG. 3a and FIG. 3b, S203 may be specifically performed.

S203: The core network device searches, in a second terminal device access capability set, for a radio access capability corresponding to the first access capability indication information, and if the radio access capability corresponding to the first access capability indication information exists, performs S204 and S205, as shown in FIG. 3a, and if the radio access capability corresponding to the first access capability indication information does not exist, performs S206 to S208, as shown in FIG. 3b.

After receiving the second message, the core network device may obtain the radio access capability of the terminal device with reference to the second terminal device access capability set.

The second terminal device access capability set is a set of access capability indication information and radio access capabilities corresponding to the access capability indication information. In other words, the second terminal device access capability set may include a plurality of radio access capabilities, and each radio access capability has corresponding access capability indication information. Herein, the second terminal device access capability set may be set information maintained by the core network device. It may be understood that a manner of maintaining the second terminal device access capability set is similar to that of maintaining the first terminal device access capability set, and details are not described herein again.

It should be noted that the second terminal device access capability set may be the same as or different from the first terminal device access capability set.

Optionally, because the second terminal device access capability set includes radio access capabilities of some or even all of terminal devices managed by the core network device, a quantity of radio access capabilities stored in the second terminal device access capability set may be far greater than a quantity of radio access capabilities stored in the first terminal device access capability set.

After receiving the second message, the core network device searches, in the second terminal device access capability set, for the radio access capability corresponding to the first access capability indication information. It is worth mentioning that a case in which the second terminal device access capability set is an empty set, in other words, the second terminal device access capability set does not store any radio access capability, is not excluded. Specifically, mapping relationships between the access capability indication information and the radio access capabilities in the second terminal device access capability set are consistent with those reflected in Table 1 and Table 2 mentioned in S103, and details are not described herein again.

S204: The core network device uses the radio access capability that corresponds to the first access capability indication information and that is in the second terminal device access capability set as the radio access capability of the terminal device according to the first access capability indication information.

S205: The core network device sends a third message to the access network device, where the third message carries the radio access capability of the terminal device.

The core network device sends the obtained radio access capability of the terminal device to the access network device by using the third message. The third message, for example, may be carried by a terminal device context setup request (UE CONTEXT SETUP REQUEST). To be specific, the core network device sends the terminal device context setup request to the access network device, where the terminal device context setup request carries the radio access capability of the terminal device.

In the foregoing manner, in the RRC connection setup procedure, the access network device may initiate a process of obtaining the radio access capability of the terminal device to the core network device, so that air interface configuration can be delivered more quickly, communication performance is improved, and an access delay is reduced.

As shown in FIG. 3a, after S205, S211 may be further performed.

S206: The core network device sends the third message to the access network device, where the third message does not carry the radio access capability of the terminal device.

The third message does not carry the radio access capability of the terminal device, for indicating to the access network device that the core network device does not store the radio access capability of the terminal device, and the access network device needs to request the terminal device for the radio access capability of the terminal device. The third message may be specifically carried by a context setup request (UE CONTEXT SETUP REQUEST). To be specific, the terminal device context setup request (UE CONTEXT SETUP REQUEST) sent by the core network device does not carry the radio access capability of the terminal device, and may indicate to the access network device that the core network device does not obtain the radio access capability of the terminal device.

S207: The access network device requests the terminal device for the radio access capability of the terminal device.

Because the third message sent by the core network device does not carry the radio access capability of the terminal device, the access network device further requests the terminal device for the radio access capability of the terminal device, for example, requests the terminal device by using a UE Capability Enquiry message, for requesting the terminal device to send the radio access capability of the terminal device to the access network device.

S208: The terminal device sends terminal device access capability information to the access network device.

The terminal device sends the terminal device access capability information (for example, UE Capability Information) to the access network device based on a received request for the radio access capability, and the terminal device access capability information includes the radio access capability of the terminal device. Optionally, the terminal device access capability information may further carry the first access capability indication information, so that the access network device correspondingly adds the first access capability indication information of the terminal device and the radio access capability of the terminal device to the first terminal device access capability set directly based on the terminal device access capability information.

As shown in FIG. 3b, after S208, S209 and S210 may be further performed, or S211 may be further performed.

A sequence in which S209 and S211 are performed is not limited. The sequence in which S209 and S211 are performed may be adjusted based on requirements, or S209 and S211 may be performed simultaneously.

S209: The access network device sends the radio access capability of the terminal device to the core network device.

The radio access capability of the terminal device may be carried by a terminal device access capability information indication (UE CAPABILITY INFO INDICATION).

S210: The core network device correspondingly adds the first access capability indication information of the terminal device and the radio access capability of the terminal device to the second terminal device access capability set.

After obtaining the radio access capability sent by the terminal device, the core network device may correspondingly add the first access capability indication information and the radio access capability of the terminal device to the second terminal device access capability set, in other words, complete an update of the second terminal device access capability set, so that when the terminal device reenters a connected mode, the core network device can directly find, in the second terminal device access capability set, the radio access capability that is of the terminal device and that corresponds to the first access capability indication information.

In this way, in the RRC connection setup procedure, the access network device may initiate a process of obtaining the radio access capability of the terminal device to the core network device. When the radio access capability of the terminal device does not exist in the core network device, the access network device can request the terminal device for the radio access capability of the terminal device more quickly, so that the access network device can obtain the radio access capability of the terminal device as early as possible. In this way, air interface configuration can be delivered more quickly, communication performance is improved, and an access delay is reduced.

S211: The access network device performs air interface configuration on the terminal device based on the radio access capability of the terminal device.

Refer to S108 for a specific implementation of S211, and details are not described herein again.

Optionally, when the access network device needs to hand over the terminal device to a target access network device, this embodiment may further include the following.

S212: When it is determined to perform access network device handover on the terminal device, the access network device sends a fourth message carrying the first access capability indication information to the target access network device.

Refer to S109 for a specific implementation of S212, and details are not described herein again.

The embodiment shown in FIG. 3a and FIG. 3b is applicable to an implementation scenario in which the core network device maintains and stores the radio access capability of the terminal device, and the access network device does not maintain and store the radio access capability of the terminal device (in the idle mode). The embodiment shown in FIG. 3a and FIG. 3b is also applicable to another scenario in which the steps of this solution can be performed. This is not specifically limited herein.

Referring to FIG. 4a to FIG. 4c-2, an embodiment of this application provides a schematic flowchart of another communication method. In this embodiment, the core network device and the access network device separately maintain and store the radio access capability of the terminal. The method includes but is not limited to the following steps.

S302: In a radio resource control RRC connection setup procedure, the terminal device sends first access capability indication information of the terminal device to the access network device.

Refer to S102 for a specific implementation of S302, and details are not described herein again.

After receiving the first access capability indication information of the terminal device, the access network device may obtain the radio access capability of the terminal device according to the first access capability indication information. In the embodiment shown in FIG. 4a to FIG. 4c-2, S303 may be specifically performed.

Figure 4A:
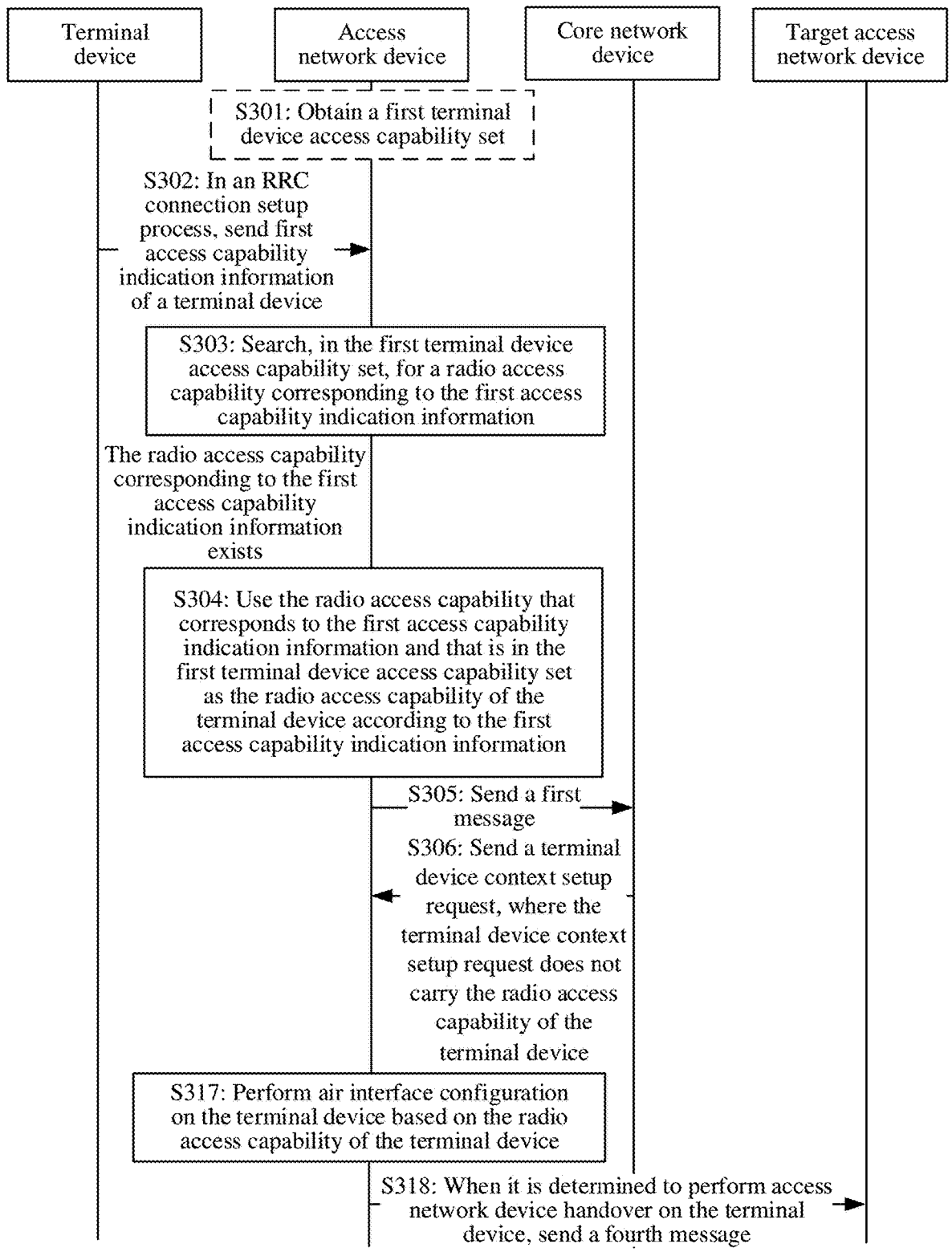
FIG. 4a is a schematic flowchart of another communication method according to an embodiment of this application.
Figures 1, 4B:
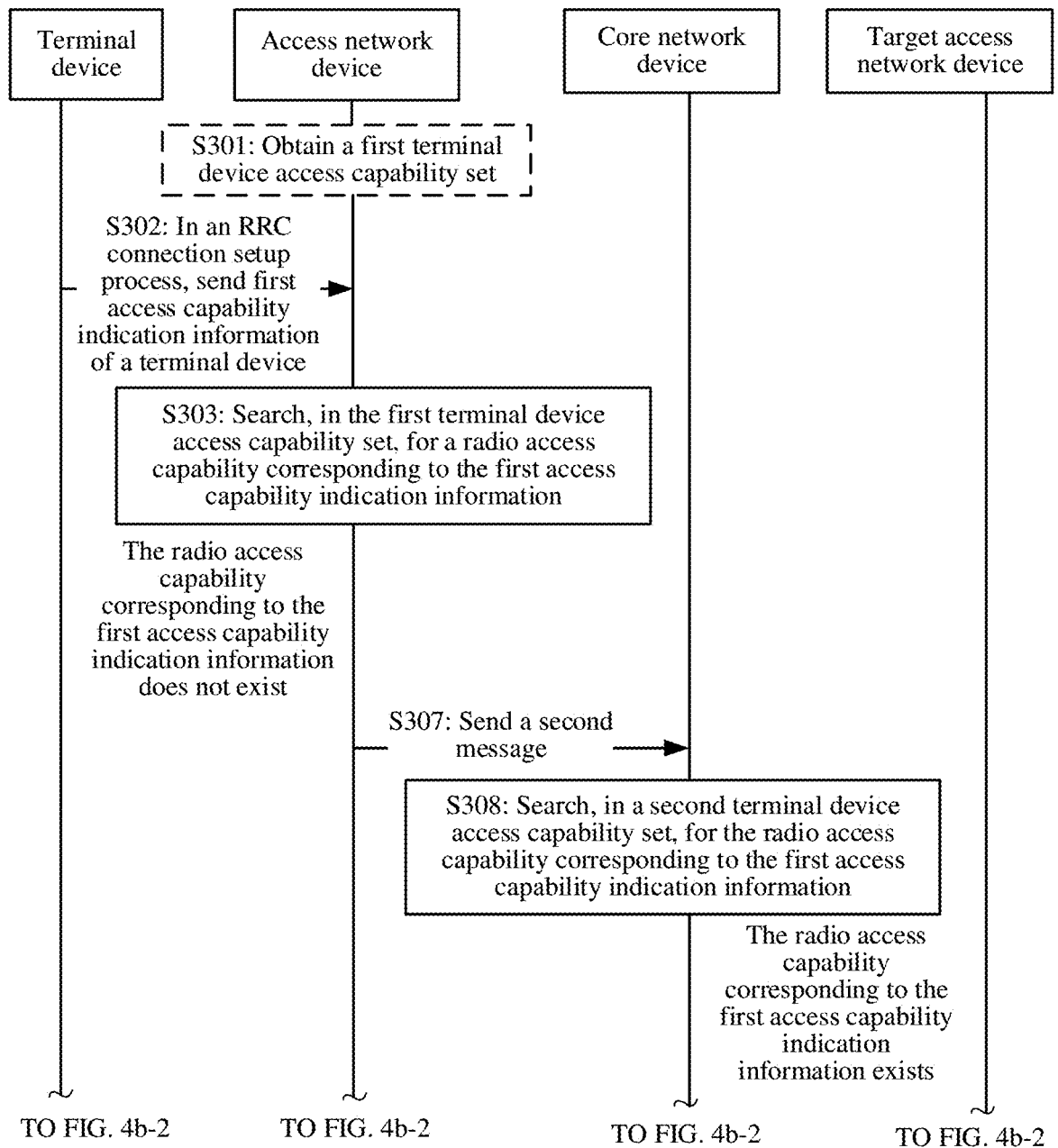
Figures 2, 4B:
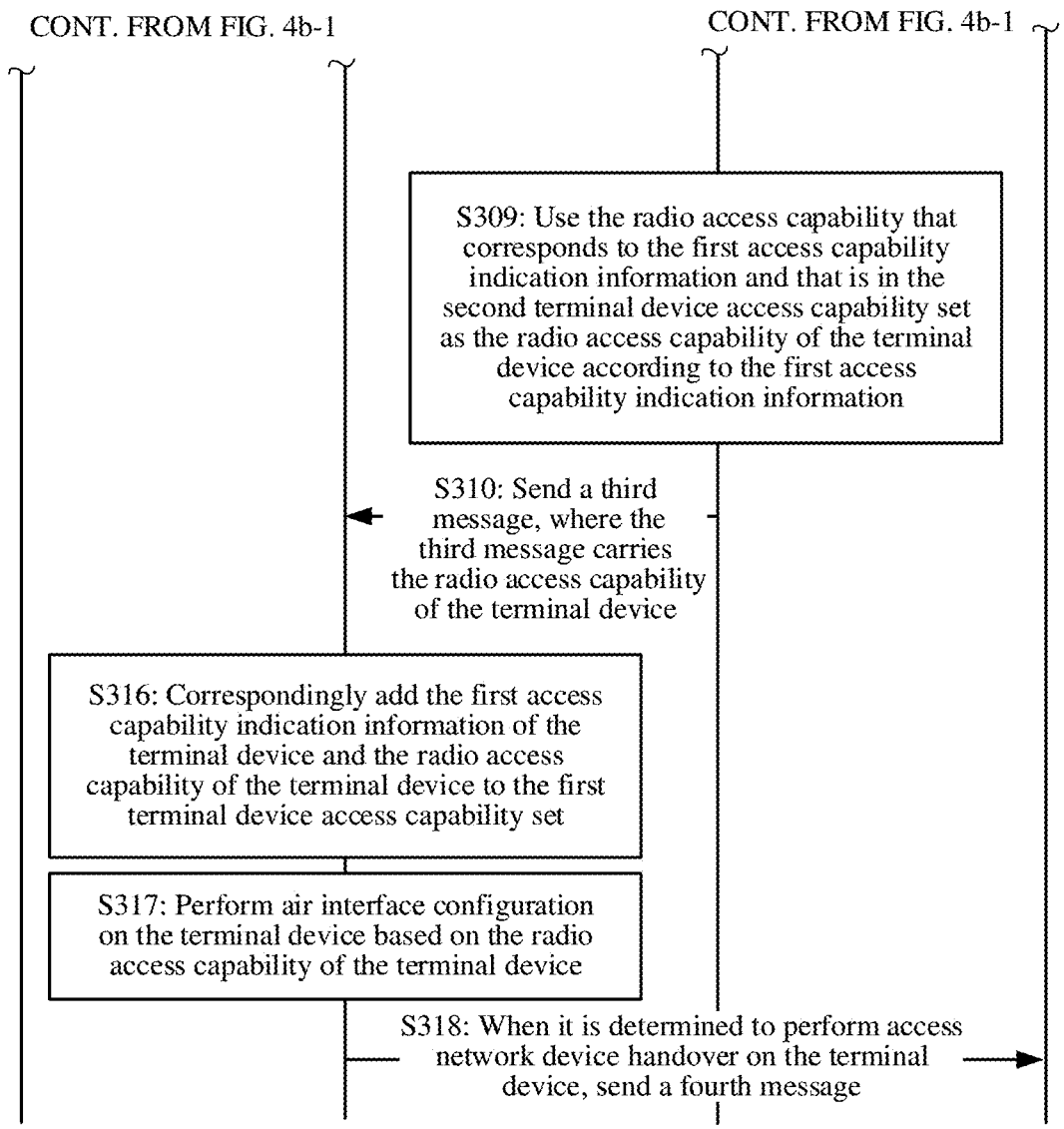
Figures 1, 4C:
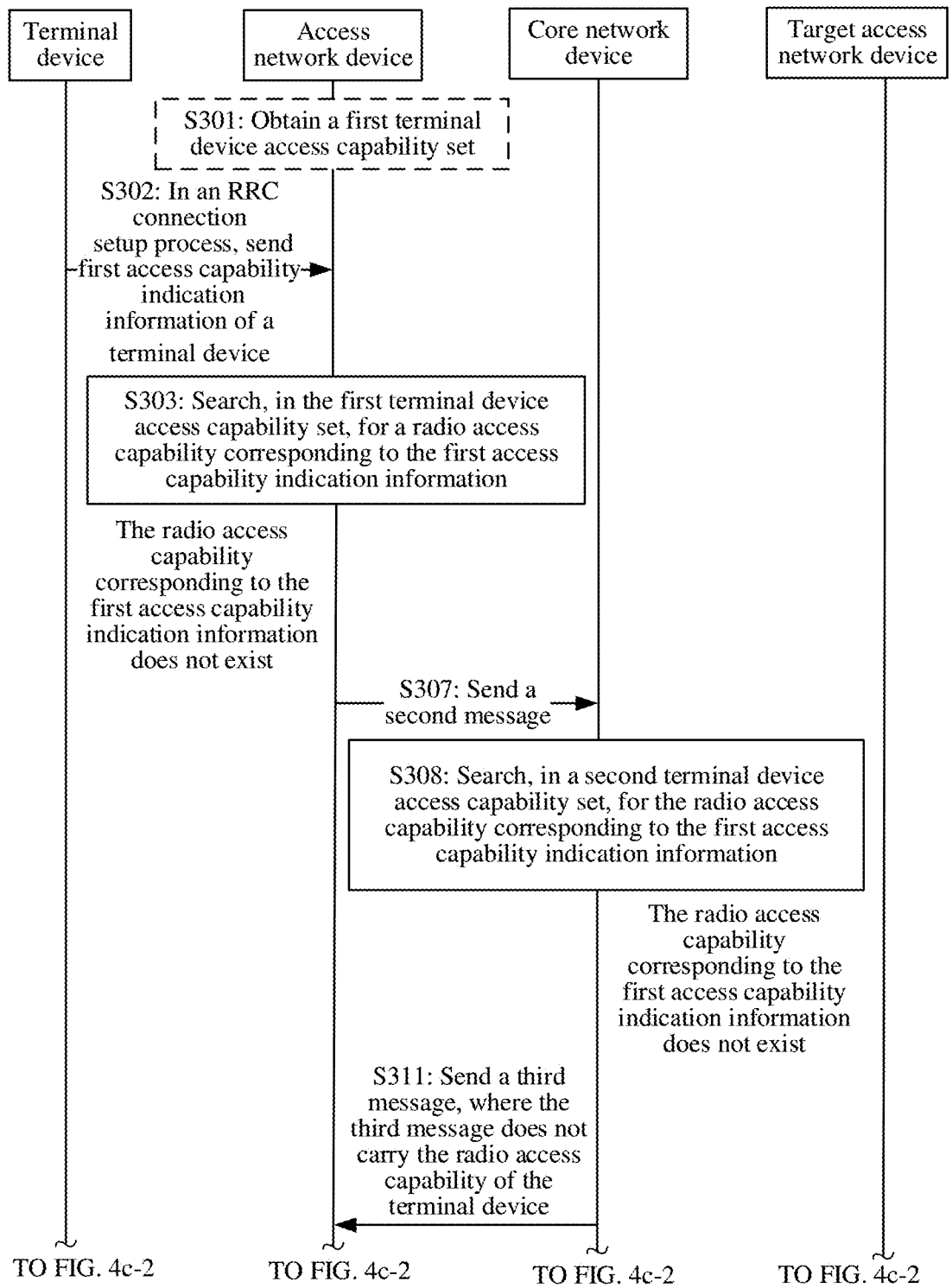
Figures 2, 4C:
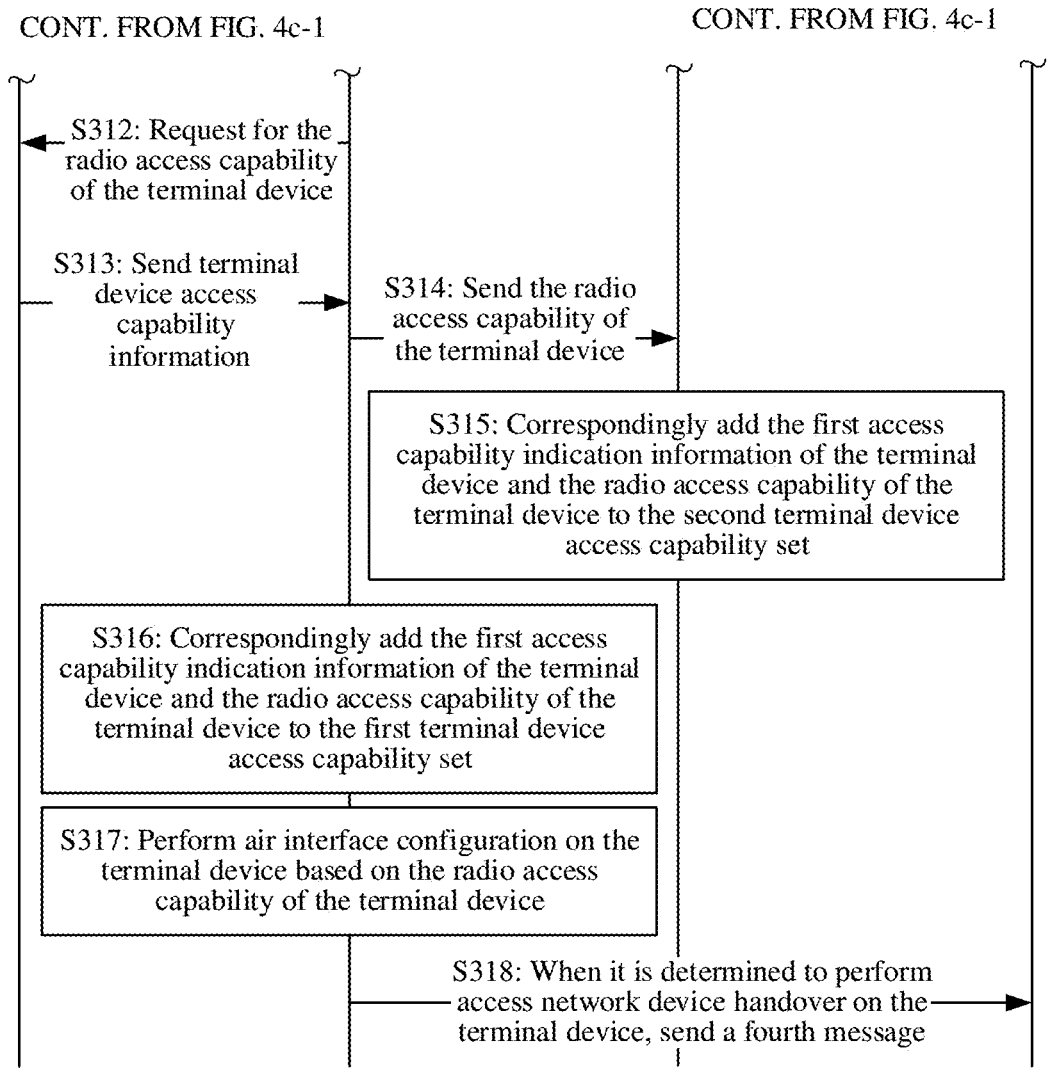

S303: The access network device searches, in a first terminal device access capability set, for a radio access capability corresponding to the first access capability indication information, and if the radio access capability corresponding to the first access capability indication information exists, performs S304, as shown in FIG. 4a, and if the radio access capability corresponding to the first access capability indication information does not exist, performs S307 to S310, as shown in FIG. 4b-1 and FIG. 4b-2, or performs S307 and S308 and S311 to S315, as shown in FIG. 4c-1 and FIG. 4c-2.

Refer to S103 for a specific implementation of S303, and details are not described herein again.

S304: The access network device uses the radio access capability that corresponds to the first access capability indication information and that is in the first terminal device access capability set as the radio access capability of the terminal device according to the first access capability indication information.

In this way, in the RRC connection setup procedure, the access network device can locally obtain the radio access capability of the terminal device, so that air interface configuration can be delivered more quickly, communication performance is improved, and an access delay is reduced. Further, when the access network device stores the radio access capability of the terminal device, an air interface only needs to transmit the first access capability indication information, and does not need to transmit the radio access capability, so that signaling overheads of the air interface are reduced.

As shown in FIG. 4a, after S304, S317 may be further performed, or S305 and S306 may be further performed.

A sequence in which S305 and S317 are performed is not limited. The sequence in which S305 and S317 are performed may be adjusted based on requirements, or S305 and S317 may be performed simultaneously.

S305: The access network device sends a first message to the core network device.

The first message is used to indicate that the access network device has obtained the radio access capability of the terminal device. The access network device and the core network device separately maintain and store the radio access capability of the terminal device. Therefore, after finding the radio access capability of the terminal device, the access network device may notify, by using the first message, the core network device that the access network device has obtained the radio access capability of the terminal device, and the core network device does not need to send the radio access capability of the terminal device to the access network device.

S306: The core network device sends a terminal device context setup request to the access network device, where the terminal device context setup request does not carry the radio access capability of the terminal device.

Based on the first message, the core network device does not add the radio access capability of the terminal device in the sent terminal device context setup request (UE CONTEXT SETUP REQUEST), so that signaling overheads can be reduced.

S307: The access network device sends a second message to the core network device.

Because the access network device does not find the radio access capability of the terminal device, the access network device sends the second message to the core network device, where the second message is used to request the core network device for the radio access capability of the terminal device.

In a possible implementation scenario, the second message may carry the first access capability indication information of the terminal device, for instructing the core network device to search for the corresponding radio access capability according to the first access capability indication information of the terminal device, and then send the radio access capability to the access network device. In another possible implementation scenario, the second message may not carry the first access capability indication information of the terminal device, and is only used for instructing the core network device to obtain the radio access capability of the terminal device.

Subsequent steps of this embodiment are further described by using an implementation scenario in which the second message carries the first access capability indication information of the terminal device as an example.

After receiving the second message of the access network device, the core network device may obtain the radio access capability of the terminal device according to the first access capability indication information. In the embodiment shown in FIG. 4, S308 may be specifically performed.

S308: The core network device searches, in a second terminal device access capability set, for a radio access capability corresponding to the first access capability indication information, and if the radio access capability corresponding to the first access capability indication information exists, performs S309 and S310, as shown in FIG. 4b-1 and FIG. 4b-2, and if the radio access capability corresponding to the first access capability indication information does not exist, performs S311 to S315, as shown in FIG. 4c-1 and FIG. 4c-2.

Refer to S203 for a specific implementation of S308, and details are not described herein again.

S309: The core network device uses the radio access capability that corresponds to the first access capability indication information and that is in the second terminal device access capability set as the radio access capability of the terminal device according to the first access capability indication information.

S310: The core network device sends a third message to the access network device, where the third message carries the radio access capability of the terminal device.

Refer to S205 for a specific implementation of S310, and details are not described herein again.

As shown in FIG. 4b-1 and FIG. 4b-2, after S310, S316 may be further performed, or S317 may be further performed.

In this way, in the RRC connection setup procedure, when determining that the radio access capability of the terminal device is not stored, the access network device may initiate a process of obtaining the radio access capability of the terminal device to the core network device, so that air interface configuration can be delivered more quickly, communication performance is improved, and an access delay is reduced.

S311: The core network device sends the third message to the access network device, where the third message does not carry the radio access capability of the terminal device.

S312: The access network device requests the terminal device for the radio access capability of the terminal device.

S313: The terminal device sends terminal device access capability information to the access network device.

As shown in FIG. 4c-1 and FIG. 4c-2, after S313, S314 and S315 may be further performed, or S316 may be further performed, or S317 may be further performed.

A sequence in which S314, S316, and S317 are performed is not limited. The sequence in which S314, S316, and S317 are performed may be adjusted based on requirements, or S314, S316, and S317 may be performed simultaneously.

S314: The access network device sends the radio access capability of the terminal device to the core network device.

S315: The core network device correspondingly adds the first access capability indication information of the terminal device and the radio access capability of the terminal device to the second terminal device access capability set.

Refer to descriptions of S206 to S210 for a specific implementation of S311 to S315, and details are not described herein again.

In this way, in the RRC connection setup procedure, when determining that the radio access capability of the terminal device is not stored, the access network device may initiate a process of obtaining the radio access capability of the terminal device to the core network device. When the radio access capability of the terminal device does not exist in the core network device, the access network device can request the terminal device for the radio access capability of the terminal device more quickly, so that the access network device can obtain the radio access capability of the terminal device as early as possible. In this way, air interface configuration can be delivered more quickly, communication performance is improved, and an access delay is reduced.

S316: The access network device correspondingly adds the first access capability indication information of the terminal device and the radio access capability of the terminal device to the first terminal device access capability set.

Refer to S107 for a specific implementation of S316, and details are not described herein again.

S317: The access network device performs air interface configuration on the terminal device based on the radio access capability of the terminal device.

Refer to S108 for a specific implementation of S317, and details are not described herein again.

Optionally, before S302, the access network device may perform S301.

S301: The access network device obtains the first terminal device access capability set.

After the access network device is powered on, the access network device may obtain the initial first terminal device access capability set by using an OSS (Operation Support System, operation support system). Alternatively, when an interface between the core network device and the access network device is set up, the core network device sends the second terminal device access capability set maintained by the core network device to the access network device as the first terminal device access capability set of the access network device. Further, when subsequently newly adding the radio access capability and the corresponding access capability indication information, the core network device may also send the radio access capability and the corresponding access capability indication information to the access network device, so that the access network device can also update the first terminal device access capability set.

Optionally, when the access network device needs to hand over the terminal device to a target access network device, this embodiment may further include the following.

S318: When it is determined to perform access network device handover on the terminal device, the access network device sends a fourth message carrying the first access capability indication information to the target access network device.

Refer to S109 for a specific implementation of S318, and details are not described herein again.

The embodiment shown in FIG. 4a to FIG. 4c-2 is applicable to an implementation scenario in which the core network device and the access network device separately maintain and store the radio access capability of the terminal device, and is also applicable to another scenario in which the steps of this solution can be performed. This is not specifically limited herein.

Referring to FIG. 5a-1 to FIG. 5b-2, an embodiment of this application provides a schematic flowchart of another communication method. In this embodiment, the core network device and the access network device together maintain and store the radio access capability of the terminal. The method includes but is not limited to the following steps.

S402: In a radio resource control RRC connection setup procedure, the access network device detects whether first access capability indication information of the terminal device is received.

In the radio resource control RRC connection setup procedure, the terminal device may send an RRC connection request message or an RRC connection setup complete message to the access network device. The access network device may detect whether the RRC connection request message or the RRC connection setup complete message sent by the terminal device carries the first access capability indication information of the terminal device. In this embodiment, the first access capability indication information of the terminal device may be a radio access capability identifier. The radio access capability identifier is an identification code corresponding to the radio access capability, and may be an identifier formed by combining numerals, letters, symbols, or the like, for example, 123 or C1. This is not specifically limited in this embodiment. The radio access capability identifier may be allocated by the core network device to the terminal device when the terminal device initially accesses a network (that is, allocated in subsequent S411).

S403: If the access network device does not receive the first access capability indication information of the terminal device, the access network device requests the terminal device for the radio access capability of the terminal device.

In this embodiment, when the access network device does not receive the first access capability indication information of the terminal device, it may be considered that the core network device does not know the first access capability indication information corresponding to the radio access capability of the terminal device, or the core network device even does not know the radio access capability of the terminal device, so that the core network device does not allocate the first access capability indication information to the terminal device.

Therefore, the access network device may directly request the terminal device for the radio access capability of the terminal device. For example, the access network device requests the terminal device by using a UE Capability Enquiry message, for requesting the terminal device to send the radio access capability of the terminal device to the access network device, so that the access network device can obtain the radio access capability of the terminal device by using the terminal device earlier, and does not need to request the core network device and then request the terminal device for the radio access capability of the terminal device.

S404: The terminal device sends terminal device access capability information to the access network device.

Refer to S208 for a specific implementation of S404, and details are not described herein again.

Further, after S404, S405 and S406 may be further performed.

S405: The access network device sends the radio access capability of the terminal device to the core network device.

Refer to S209 for a specific implementation of S405, and details are not described herein again.

Figures 1, 5A:
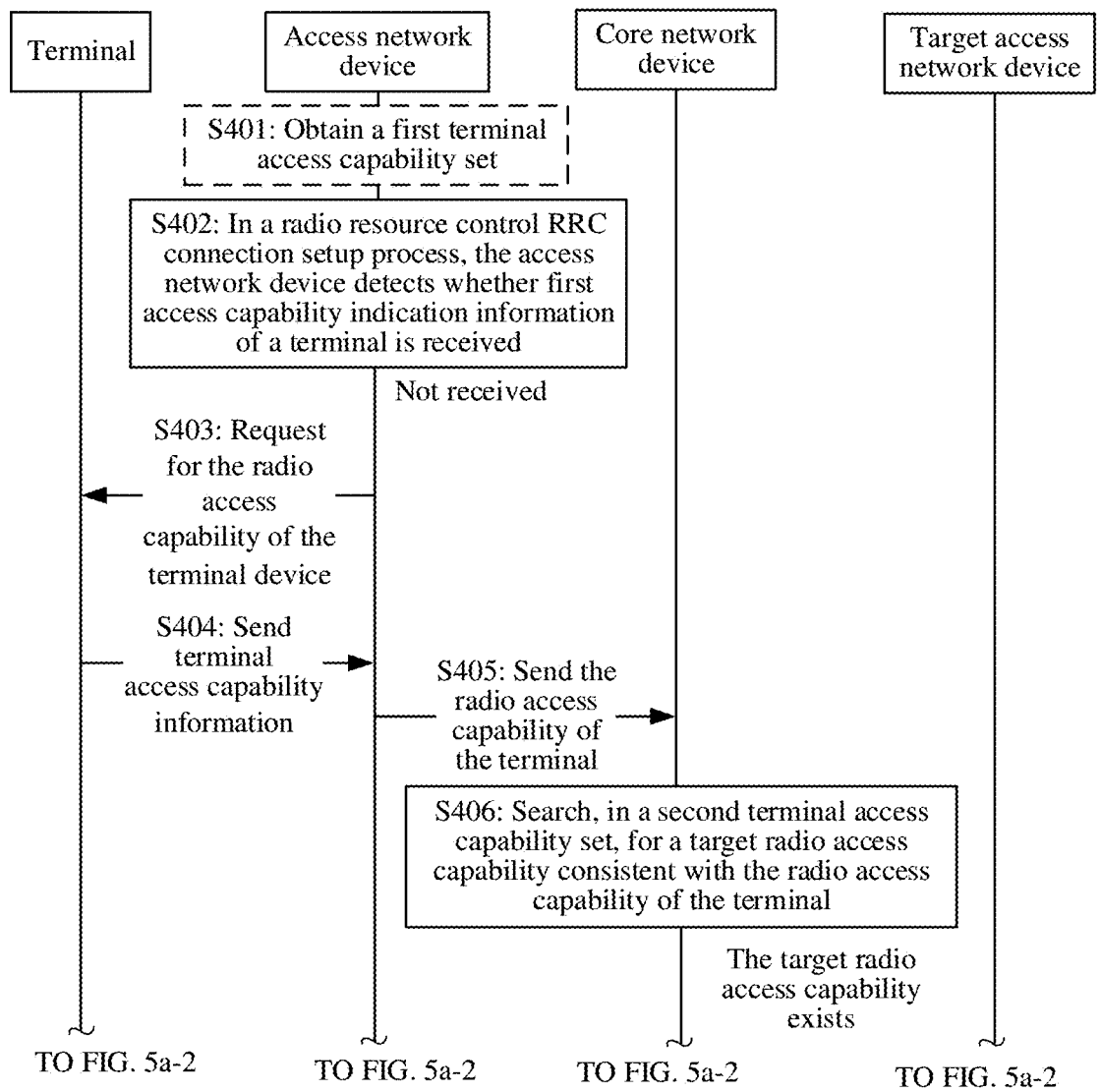
Figures 2, 5A:
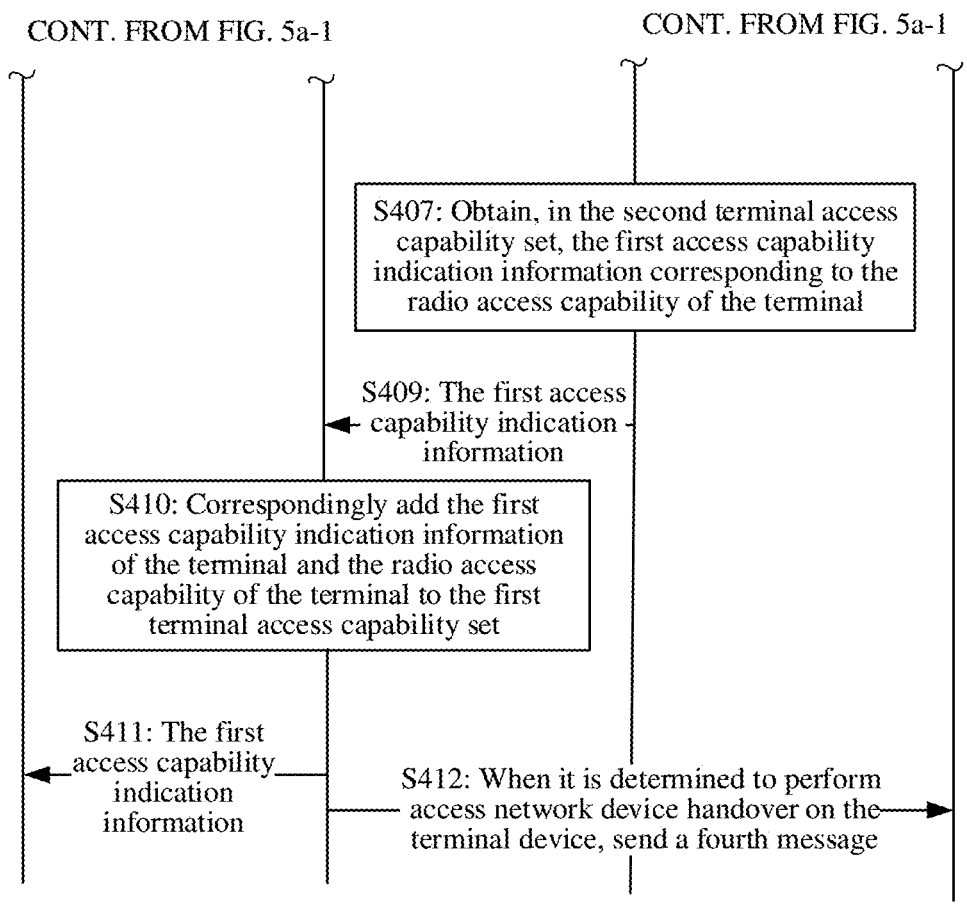
Figures 1, 5B:
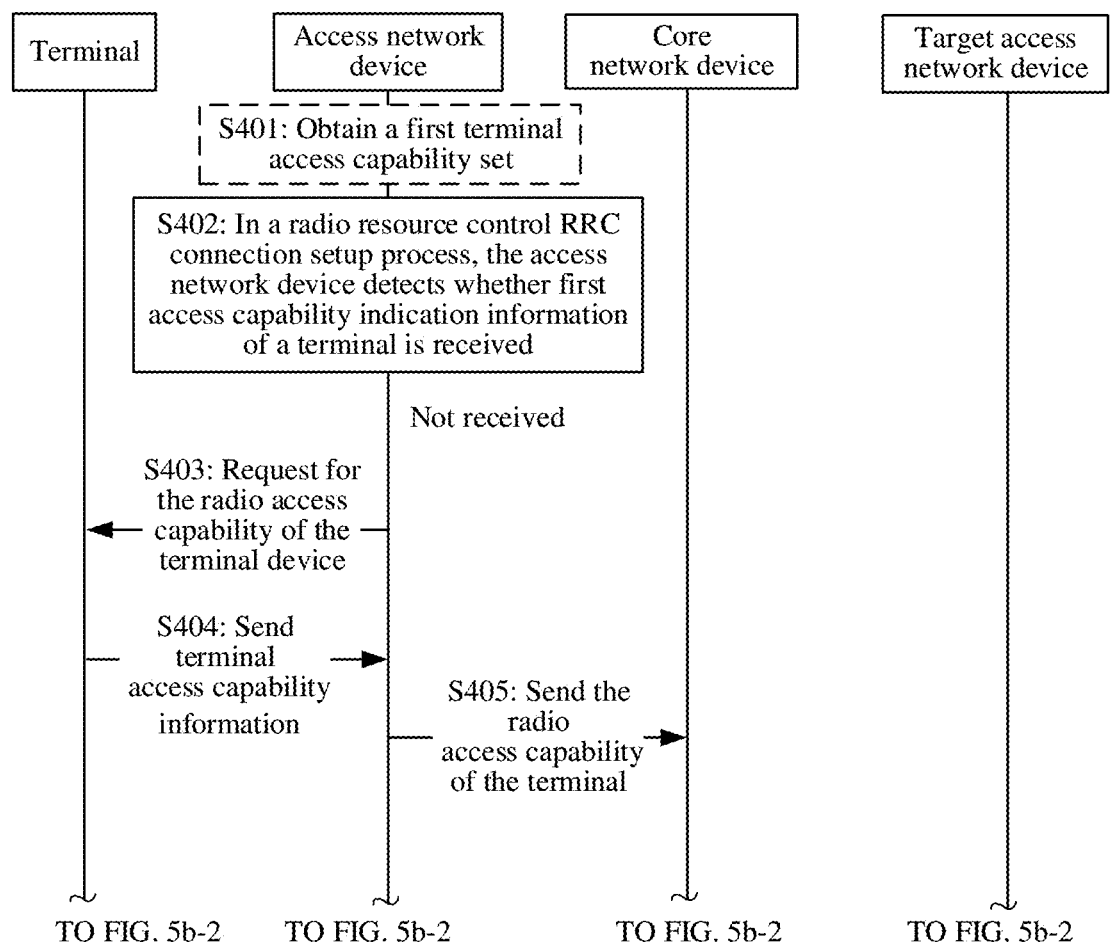
Figures 2, 5B:
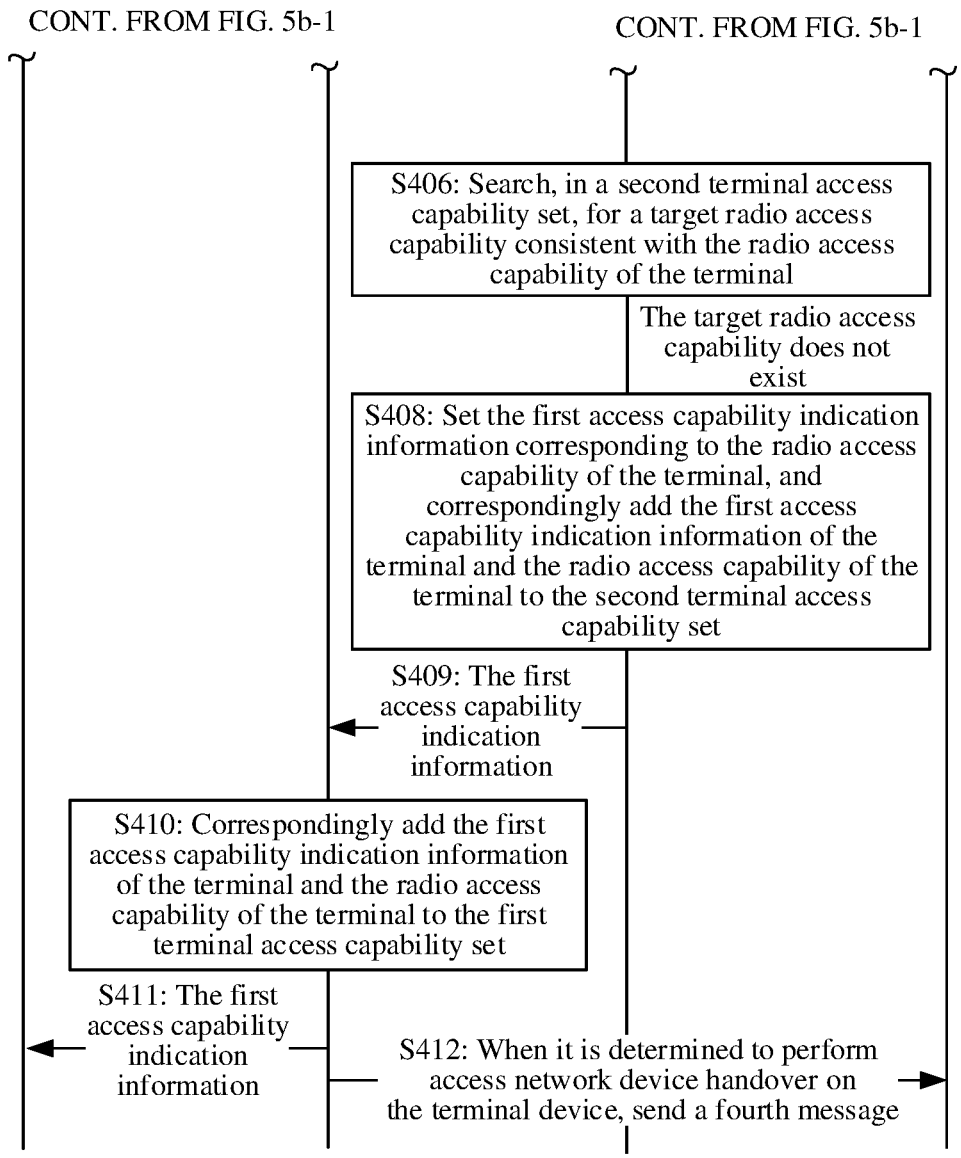

S406: The core network device searches, in the second terminal device access capability set, for a target radio access capability consistent with the radio access capability of the terminal device, if the target radio access capability exists, performs S407, as shown in FIG. 5a-1 and FIG. 5a-2, if the target radio access capability does not exist, performs S408, as shown in FIG. 5b-1 and FIG. 5b-2.

The second terminal device access capability set is a set of access capability indication information and radio access capabilities corresponding to the access capability indication information. In other words, the second terminal device access capability set may include a plurality of radio access capabilities, and each radio access capability has corresponding access capability indication information. In this embodiment, the access capability indication information is the radio access capability identifier, and radio access capability identifiers in the second terminal device access capability set are in one-to-one correspondence to the radio access capabilities. Specifically, mapping relationships between the access capability indication information and the radio access capabilities in the second terminal device access capability set are consistent with those reflected in Table 2 mentioned in S103, and details are not described herein again.

Optionally, a byte stream of the radio access capability of the terminal device may be compared with a byte stream of each radio access capability in the second terminal device access capability set. If there is a target radio access capability with a completely consistent byte stream, it is determined that the target radio access capability is consistent with the radio access capability of the terminal device, that is, the target radio access capability is the radio access capability of the terminal device. If there is no radio access capability with a completely consistent byte stream, it is determined that a target radio access capability consistent with the radio access capability of the terminal device does not exist in the second terminal device access capability set. It is worth mentioning that a case in which the second terminal device access capability set is an empty set, in other words, the second terminal device access capability set does not store any radio access capability, is not excluded herein. In this case, a target radio access capability consistent with the radio access capability of the terminal device does not exist in the second terminal device access capability set.

S407: The core network device obtains, in the second terminal device access capability set, the first access capability indication information corresponding to the radio access capability of the terminal device.

The core network device determines the target radio access capability consistent with the radio access capability of the terminal device, that is, the target radio access capability is the radio access capability of the terminal device. Therefore, that the core network device obtains, in the second terminal device access capability set, the first access capability indication information corresponding to the target radio access capability is that the core network device obtains the first access capability indication information corresponding to the radio access capability of the terminal device.

After S407, S409 may be further performed.

S408: The core network device sets the first access capability indication information corresponding to the radio access capability of the terminal device, and correspondingly adds the first access capability indication information of the terminal device and the radio access capability of the terminal device to the second terminal device access capability set.

When the target radio access capability consistent with the radio access capability of the terminal device does not exist in the second terminal device access capability set, the core network device may set the first access capability indication information corresponding to the radio access capability of the terminal device, and correspondingly adds the first access capability indication information of the terminal device and the radio access capability of the terminal device to the second terminal device access capability set, that is, completes setting of the first access capability indication information corresponding to the radio access capability of the terminal device and an update of the second terminal device access capability set, so that when the terminal device reenters a connected mode, the core network device can directly find, in the second terminal device access capability set, the radio access capability that is of the terminal device and that corresponds to the first access capability indication information.

After S408, S409 may alternatively be further performed.

S409: The core network device sends the first access capability indication information to the access network device.

After S409, S410 may be further performed, and S411 may also be further performed.

A sequence in which S410 and S411 are performed is not limited. The sequence in which S410 and S411 are performed may be adjusted based on requirements, or S410 and S411 may be performed simultaneously.

S410: The access network device correspondingly adds the first access capability indication information of the terminal device and the radio access capability of the terminal device to the first terminal device access capability set.

The access network device correspondingly adds the radio access capability of the terminal device that is obtained from the terminal device and the first access capability indication information of the terminal device that is obtained from the core network device to the first terminal device access capability set, that is, completes an update of the first terminal device access capability set. In this way, when the terminal device reenters a connected mode, the access network device may directly find, in the first terminal device access capability set, the radio access capability that is of the terminal device and that corresponds to the first access capability indication information without requesting the terminal device for the radio access capability, so that air interface configuration can be delivered more quickly, communication performance is improved, and an access delay is reduced.

S411: The access network device sends the first access capability indication information to the terminal device.

The terminal device may obtain the first access capability indication information of the terminal device, so that when subsequently entering a connected mode, the terminal device can send the first access capability indication information in the RRC connection setup procedure, to perform processes of the embodiments shown in FIG. 2a to FIG. 4c-2. Further, if the second terminal device access capability set in the core network device is not deleted or changed, when receiving the first access capability indication information, the access network device may determine that the radio access capability that is of the terminal and that corresponds to the first access capability indication information exists in the core network device, and then can directly request the core network device for the radio access capability that is of the terminal and that corresponds to the first access capability indication information. Certainly, if the radio access capability that is of the terminal and that corresponds to the first access capability indication information has existed in the first terminal device access capability set in the access network device, the radio access capability of the terminal can be directly obtained locally.

It should be noted that in this embodiment, the first access capability indication information, that is, the radio access capability identifier, may be of a PLMN (Public Land Mobile Network, public land mobile network) level. To be specific, the radio access capability identifier is valid in a current PLMN. If the terminal device obtains the radio access capability identifier and does not change a PLMN, the terminal device carries the radio access capability identifier when subsequently entering a connected mode. Alternatively, the radio access capability identifier may be of a core network level. To be specific, the radio access capability identifier is valid in a current core network. If the terminal device obtains the radio access capability identifier and does not change a core network, the terminal device carries the radio access capability identifier when subsequently entering a connected mode.

Optionally, when the access network device needs to hand over the terminal device to a target access network device, this embodiment may further include the following.

S412: When it is determined to perform access network device handover on the terminal device, the access network device sends a fourth message carrying the first access capability indication information to the target access network device.

Refer to S109 for a specific implementation of S412, and details are not described herein again.

Optionally, before S402, S401 may be further performed.

S401: Obtain the first terminal device access capability set.

Refer to S301 for a specific implementation of S401, and details are not described herein again.

In the embodiment shown in FIG. 5a-1 to FIG. 5b-2, the access network device does not receive the first access capability indication information of the terminal device in the RRC connection setup procedure, and it may indicate that the core network device does not know the first access capability indication information corresponding to the radio access capability of the terminal device, so that the core network device directly requests the terminal device for the radio access capability of the terminal device, to obtain the radio access capability of the terminal device more quickly, thereby delivering air interface configuration, improving communication performance, and reducing an access delay.

The embodiment shown in FIG. 5a-1 to FIG. 5b-2 is applicable to an implementation scenario in which the core network device and the access network device separately maintain and store the radio access capability of the terminal device, and is also applicable to another scenario in which the steps of this solution can be performed. This is not specifically limited herein.

It may be understood that the communication method for handing over the terminal device to the target access network device by the access network device in the embodiments shown in FIG. 2a to FIG. 5b-2 is applicable to any scenario in which access network device handover needs to be performed. Therefore, the communication method during the access network device handover may also be separately implemented independently of other embodiments.

Figure 6:
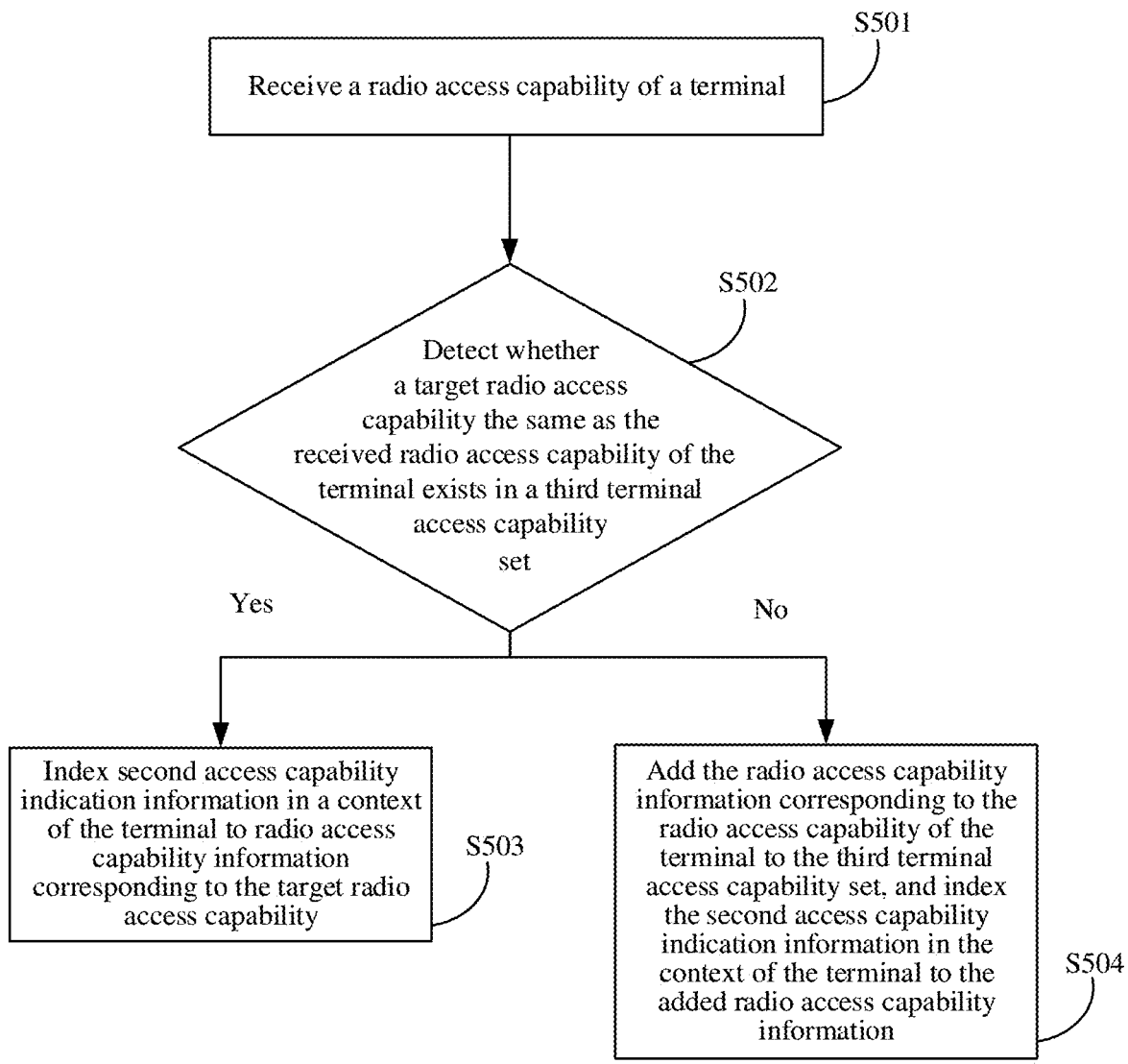
FIG. 6 is a schematic flowchart of another communication method according to an embodiment of this application.

FIG. 6 is a schematic flowchart of another communication method according to an embodiment of this application. In this embodiment, an execution body may be a network device applicable to this implementation scenario, for example, a core network device or an access network device. The method includes but is not limited to the following steps.

S501: Receive a radio access capability of a terminal device.

In an implementation scenario in which the execution body is the core network device, the core network device may directly receive the radio access capability sent by the terminal device, or receive the radio access capability of the terminal device that is sent by the access network device. The radio access capability of the terminal device is usually sent to the core network device by the access network device after the access network device requests the terminal device for the radio access capability. In this implementation scenario, the radio access capability of the terminal device may be carried by a terminal device access capability information indication (UE CAPABILITY INFO INDICATION). This is not specifically limited herein.

In an implementation scenario in which the execution body is the access network device, the access network device may receive the radio access capability of the terminal device that is sent by the core network device, or receive the radio access capability of the terminal device that is sent by the terminal device. In this implementation scenario, the radio access capability of the terminal device that is sent by the access network device may be carried by a terminal device context setup request (UE CONTEXT SETUP REQUEST). The radio access capability of the terminal device that is sent by the terminal device may be carried by a terminal device access capability information indication (UE CAPABILITY INFO INDICATION).

Further, the radio access capability of the terminal device may also be obtained by other means. This is not specifically limited herein.

S502: Detect whether a target radio access capability the same as the received radio access capability of the terminal device exists in a third terminal device access capability set. If the target radio access capability exists, S503 is performed, and if the target radio access capability does not exist, S504 is performed.

The third terminal device access capability set is a set of radio access capability information. The radio access capability information may be a radio access capability. The radio access capability information may further include one or more eigenvalues corresponding to the radio access capability. Further, the radio access capability information may further include indication information corresponding to the radio access capability. Certainly, the third terminal device access capability set may also include other information. An eigenvalue may be a characteristic parameter that reflects a radio access capability, for example, a cyclic redundancy check. The indication information may be terminal device model information or a radio access capability identifier, or may be an identifier formed by combining numerals, symbols, text, or the like.

In an implementation scenario in which the execution body is the access network device, in consideration of that the access network device may obtain an ASN.1 encoded byte stream in S501, the access network device needs to perform decoding to use the radio access capability of the terminal device. Therefore, a radio access capability in each piece of radio access capability information in the third terminal device access capability set may be specifically an ASN.1 encoded byte stream. Alternatively, both the ASN.1 encoded byte stream and the ASN.1 decoded radio access capability may be included, so that a base station can directly use the ASN.1 decoded radio access capability, and does not need to perform decoding and store the decoded radio access capability for a plurality of times, to reduce processing overheads and storage overheads.

For example, Table 3 and Table 4 may indicate a plurality of pieces of radio access capability information in the third terminal device access capability set. Table 3 is a case in which the third terminal device access capability set includes only radio access capabilities. Table 4 is a case in which the third terminal device access capability set includes radio access capabilities and one or more eigenvalues corresponding thereto. Table 5 is a case in which the third terminal device access capability set includes radio access capabilities, and also includes one or more eigenvalues corresponding to the radio access capabilities and access capability indication information corresponding to the radio access capabilities.

TABLE 3

Third terminal device access capability set
Radio access capability
(ASN.1 encoded byte stream or/and ASN.1 decoded radio access capability)

Radio access capability A
Radio access capability B
Radio access capability C
. . .

TABLE 4

Third terminal device access capability set

| Eigenvalue (Cyclic redundancy check) | Radio access capability |
| --- | --- |
| 1001 | Radio access capability A |
| 0100 | Radio access capability B |
| 1110 | Radio access capability C |
| . . . | . . . |

TABLE 5

Third terminal device access capability set

| Access capability indication information (Radio access capability identifier) | Eigenvalue (Cyclic redundancy check) | Radio access capability |
| --- | --- | --- |
| C1 | 1001 | Radio access capability A |
| C2 | 0100 | Radio access capability B |
| C3 | 1110 | Radio access capability C |
| . . . | . . . | . . . |

After obtaining the radio access capability of the terminal device, the core network device or the access network device may detect whether the target radio access capability the same as the received radio access capability of the terminal device exists in the third terminal device access capability set.

In a possible implementation scenario, the core network device or the access network device may sequentially compare byte streams of radio access capabilities in the third terminal device access capability set with a byte stream of the radio access capability of the terminal device. If a first access capability having a byte stream consistent with the byte stream of the radio access capability of the terminal device exists, the first access capability is determined as a target radio access capability. In other words, the target radio access capability exists in the third terminal device access capability set.

In another possible implementation scenario, the core network device or the access network device may first compare byte stream lengths of radio access capabilities in the third terminal device access capability set with a byte stream length of the radio access capability of the terminal device. If a radio access capability having a byte stream length consistent with the byte stream length of the radio access capability of the terminal device exists, a byte stream of the radio access capability having the consistent byte stream length is further compared with the byte stream of the radio access capability of the terminal device, to determine whether a target radio access capability exists. If a radio access capability having a byte stream length consistent with the byte stream length of the radio access capability of the terminal device does not exist, it may be directly determined that the target radio access capability does not exist.

In still another possible implementation scenario, when receiving the radio access capability of the terminal device, the core network device or the access network device also receives an eigenvalue (for example, a cyclic redundancy check (CRC)) for the radio access capability of the terminal device. The eigenvalue may be obtained by calculating the radio access capability of the terminal device based on a preset algorithm. An eigenvalue corresponding to each radio access capability is also stored in the third terminal device access capability set. Therefore, when receiving the radio access capability of the terminal device, the core network device or the access network device may first compare eigenvalues of radio access capabilities in the third terminal device access capability set with an eigenvalue of the radio access capability of the terminal device. If a radio access capability having an eigenvalue consistent with the eigenvalue of the radio access capability of the terminal device exists, a byte stream of the radio access capability having the consistent eigenvalue is further compared with the byte stream of the radio access capability of the terminal device, to determine whether a target radio access capability exists. If a radio access capability having an eigenvalue consistent with the eigenvalue of the radio access capability of the terminal device does not exist, it may be directly determined that the target radio access capability does not exist. It is worth mentioning that there may be a plurality of eigenvalues herein, and byte streams need to be compared only when the plurality of eigenvalues are all consistent.

Further, the two manners, that is, byte stream length comparison and eigenvalue comparison may alternatively be combined. For example, the byte stream lengths of the radio capabilities in the third terminal device access capability set may be first compared with the byte stream length of the radio access capability of the terminal device, and then an eigenvalue of the radio access capability having the consistent byte stream length is compared with the eigenvalue of the radio access capability of the terminal device, and finally the byte stream of the radio access capability having the consistent eigenvalue is compared with the byte stream of the radio access capability of the terminal device, to determine whether the target radio access capability exists. Similarly, alternatively, the eigenvalues may be first compared, then the byte stream lengths are compared, and finally the byte streams are compared. This is not specifically limited in this embodiment.

In the foregoing several possible implementation scenarios, a quantity of times of radio access capability comparison can be reduced, so that processing load of a system is reduced.

S503: Index second access capability indication information in a context of the terminal device to radio access capability information corresponding to the target radio access capability.

The context of the terminal device may include some parameters or information, such as features, algorithms, bearers, and keys, required for the terminal device to perform communication, and includes the radio access capability of the terminal device. Generally, the core network device or the access network device may store the context of the terminal device. In this embodiment, the core network device or the access network device does not directly store the radio access capability of the terminal device in the context, and instead, the core network device or the access network device introduces the second access capability indication information into the context of the terminal device. The second access capability indication information may be used and be indexed to the radio access capability of the terminal device.

Optionally, when determining that the radio access capability of the terminal device is the target radio access capability, the core network device or the access network device may index the second access capability indication information in the context of the terminal device to the radio access capability information corresponding to the target radio access capability. In other words, an index is set up for the second access capability indication information in the context of the terminal device, and the index is directed to the radio access capability information corresponding to the target radio access capability.

Figure 8A:
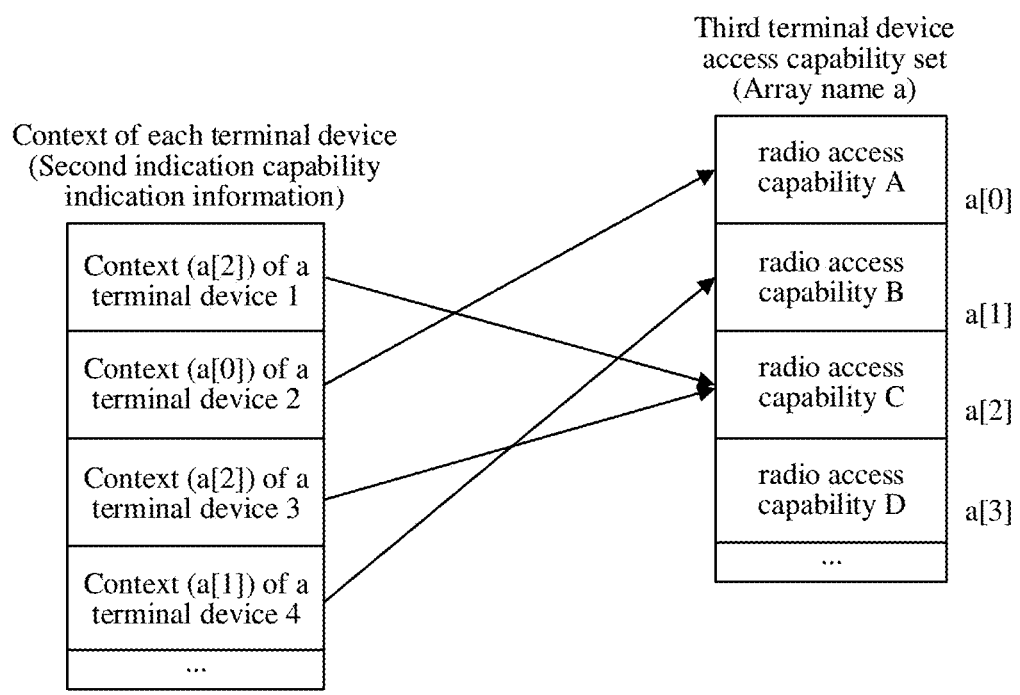
FIG. 8a is a schematic diagram of a radio access capability indexing manner according to an embodiment of this application.

In a possible implementation scenario, the second access capability indication information may be address information, for being directed to a radio access capability stored in a storage space corresponding to the address information by the third terminal device access capability set. For example, when the third terminal device access capability set is an array, the second access capability indication information is an array subscript in the array. For example, as shown in FIG. 8a, the context of the terminal device that is stored by the core network device or the access network device does not directly store the radio access capability of the terminal device, and instead, stores the second access capability indication information, that is, the array subscript. It is assumed that an array name of the third terminal device radio access capability set is a, and an array subscript (for example, 0) may correspond to a radio access capability (a[0]) in the third terminal device access capability set. Therefore, assuming that the target radio access capability is determined as the radio access capability indicated by a[1], the second access capability indication information in the context of the terminal device may be set to a[1], so that the second access capability indication information in the context of the terminal device can be indexed to the radio access capability information corresponding to the target radio access capability.

Figure 8B:
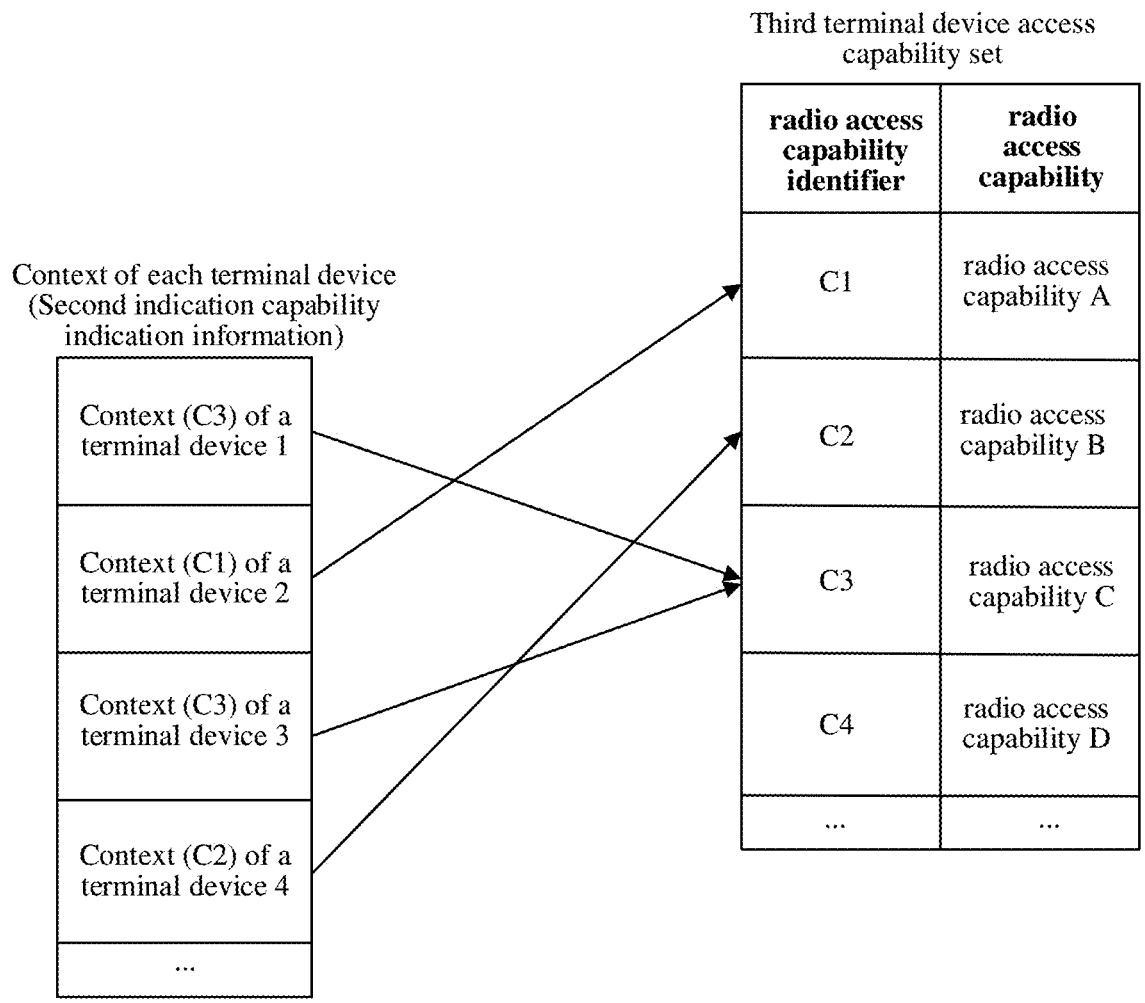
FIG. 8b is a schematic diagram of another radio access capability indexing manner according to an embodiment of this application.

In another possible implementation scenario, the second access capability indication information may be terminal device model information or a radio access capability identifier, or an identifier formed by combining numerals, symbols, text, or the like. For example, as shown in FIG. 8b, the context of the terminal device that is stored by the core network device or the access network device does not directly store the radio access capability of the terminal device, and instead, stores the second access capability indication information, for example, a radio access capability identifier. Assuming that the target radio access capability is determined as the radio access capability indicated by a radio access capability identifier C1, the second access capability indication information in the context of the terminal device may be set to C1, so that the second access capability indication information in the context of the terminal device can be indexed to the radio access capability information corresponding to the target radio access capability.

S504: Add the radio access capability information corresponding to the radio access capability of the terminal device to the third terminal device access capability set, and index the second access capability indication information in the context of the terminal device to the added radio access capability information.

When the target radio access capability does not exist in the third terminal device access capability set, the core network device or the access network device may add the radio access capability information corresponding to the radio access capability of the terminal device to the third terminal device access capability set. The radio access capability information may be the radio access capability of the terminal device, or the radio access capability of the terminal device and one or more eigenvalues corresponding to the radio access capability of the terminal device. Then, the second access capability indication information in the context of the terminal device is indexed to the added radio access capability information.

In the embodiment shown in FIG. 6, by comparing the byte streams, it can be ensured that for same radio access capabilities, only one radio access capability is stored. In other words, even if terminal devices are of different types, provided that the terminal devices have same radio access capabilities, only one radio access capability needs to be stored. The context does not store the radio access capability of the terminal device, and instead, stores the second access capability indication information for being indexed to the radio access capability of the terminal device, so that memory occupation of the access network device and the core network device by storage of the radio access capability of the terminal device can be reduced.

It may be understood that the communication method described in the embodiment shown in FIG. 6 is applicable to any scenario in which the radio access capability of the terminal device is stored. Optionally, the method in the embodiment shown in FIG. 6 may be independent of other embodiments, or may be combined with the other embodiments. For example, in the embodiment shown in FIG. 2b, after the access network device correspondingly adds the first access capability indication information of the terminal device and the radio access capability of the terminal device to the first terminal device access capability set, the context of the terminal device may not store the radio access capability of the terminal device, and instead, the first access capability indication information is used as the second access capability indication information, and the second access capability indication information in the context is indexed to the radio access capability of the terminal device that is stored in the first terminal device access capability set.

It should be noted that each time the first terminal device access capability set, the second terminal device access capability set, and the third terminal device access capability set in the embodiments shown in FIG. 2a to FIG. 6 store a radio access capability, timing on a storage time of the radio access capability may start. When it is detected that the storage time of the radio access capability exceeds a preset valid time interval, it is considered that the radio access capability fails, and the radio access capability may be further deleted from the foregoing sets.

Figure 7:
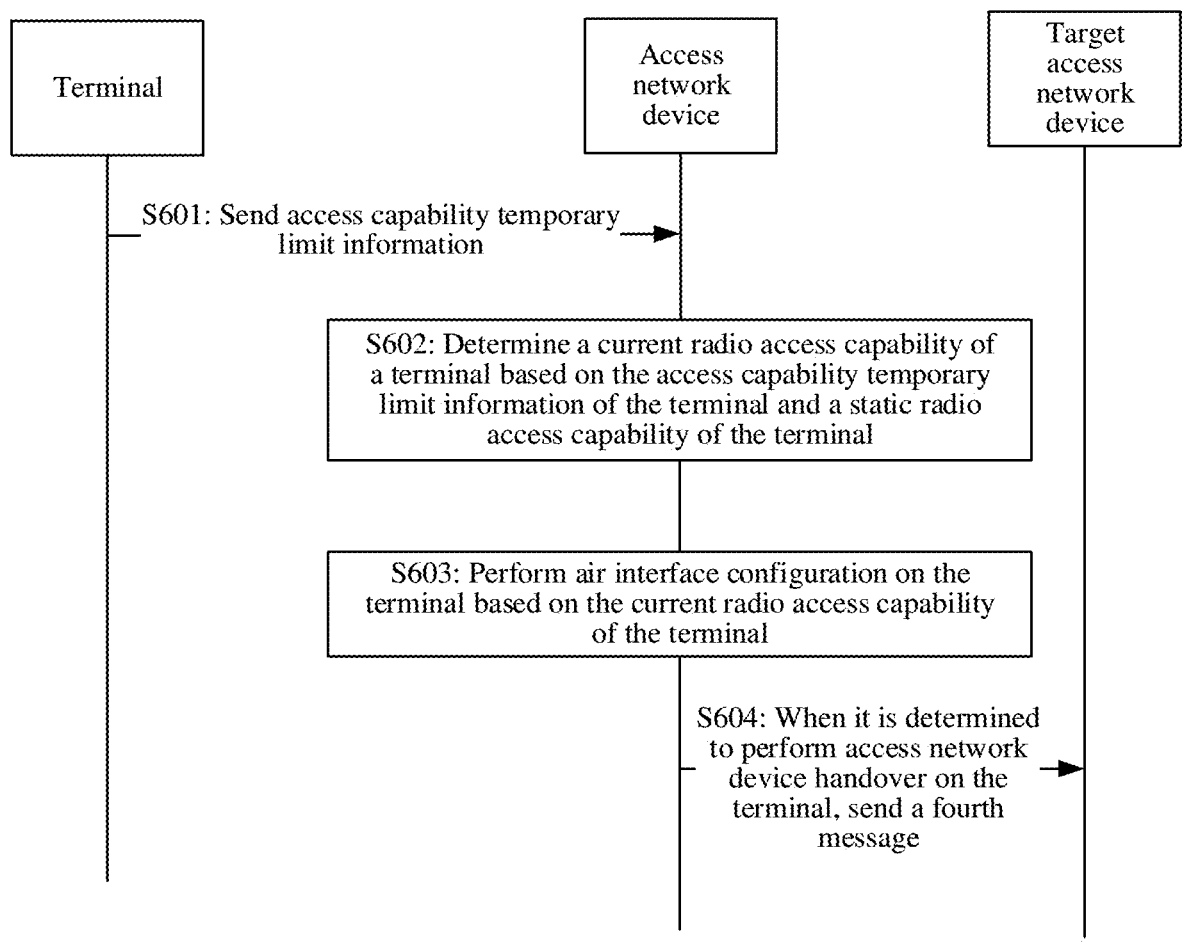
FIG. 7 is a schematic flowchart of another communication method according to an embodiment of this application.

FIG. 7 is a schematic flowchart of another communication method according to an embodiment of this application. The method includes but is not limited to the following steps.

S601: A terminal device sends access capability temporary limit information to an access network device.

In this embodiment, a current radio access capability of the terminal device that is determined by the access network device may depend on a static radio access capability and the access capability temporary limit information of the terminal device. The static radio access capability of the terminal device includes all implementable radio access capabilities owned by the terminal device, or may be considered as a most complete set of radio access capabilities of the terminal device. The access capability temporary limit information of the terminal device is used to indicate a limited capability in the static radio access capability of the terminal device, that is, a radio access capability that cannot be currently used or that has a limited use degree of the terminal device.

Further, in a possible implementation scenario, the access capability temporary limit information may be carried by an RRC connection request message or an RRC connection setup complete message. In another possible implementation scenario, if the access capability temporary limit information changes when the terminal device is inactive (inactive), when UE recovers to a connected mode, the terminal device may add the access capability temporary limit information to an RRC connection recovery request or an RRC connection recovery complete message, and sends the RRC connection recovery request or RRC connection recovery complete message that carries the access capability temporary limit information to the access network device. In other words, the access capability temporary limit information may be carried by the RRC connection recovery request or the RRC connection recovery complete message.

Optionally, when the terminal device is in a connected mode, the access capability temporary limit information of the terminal device may change for a plurality of times. Therefore, in a possible implementation scenario, when sending the access capability temporary limit information to the access network device, the terminal device can always report currently complete access capability temporary limit information. The access network device replaces existing access capability temporary limit information with the received temporary limit information as currently used access capability temporary limit information. In another possible implementation scenario, when sending the access capability temporary limit information to the access network device, the terminal device reports only limit information that changes relative to currently used access capability temporary limit information of the access network device, and the access network device generates new access capability temporary limit information based on the currently used access capability temporary limit information and the limit information that changes.

Further optionally, the terminal device may support a plurality of mobile communications standards. When reporting the access capability temporary limit information, the terminal device may report only relevant access capability temporary limit information of a mobile communications standard related to current terminal device access, to reduce signaling overheads.

S602: The access network device determines a current radio access capability of the terminal device based on the access capability temporary limit information of the terminal device and the static radio access capability of the terminal device.

In a possible implementation scenario, the access network device has obtained the static radio access capability of the terminal device, and then can directly determine the current radio access capability of the terminal device, that is, a current actually available radio access capability of the terminal device, based on the access capability temporary limit information of the terminal device and the static radio access capability of the terminal device.

In another possible implementation scenario, the access network device has not obtained the static radio access capability of the terminal device, and then the access network device may first obtain the static radio access capability of the terminal device, or obtain the static radio access capability and the access capability temporary limit information of the terminal device simultaneously, and then determine the current radio access capability of the terminal device based on the access capability temporary limit information of the terminal device and the static radio access capability of the terminal device.

A specific method for obtaining the static radio access capability of the terminal device may be an obtaining method in the prior art, or an obtaining method in the embodiments shown in FIG. 2a to FIG. 5b-2. This is not specifically limited herein.

Further, after S602, S603 may be further performed.

S603: The access network device performs air interface configuration on the terminal device based on the current radio access capability of the terminal device.

Refer to S108 for a specific implementation of S603, and details are not described herein again.

Optionally, when the access network device needs to hand over the terminal device to a target access network device, this embodiment may further include the following.

S604. When it is determined to perform access network device handover on the terminal device, the access network device sends a fourth message carrying the access capability temporary limit information to the target access network device.

The access network device determines the target access network device to which the terminal device needs to be handed over, and sends the fourth message to the target access network device. The fourth message carries the access capability temporary limit information of the terminal device. The fourth message is used to instruct the target access network device to determine the current radio access capability of the terminal device based on the access capability temporary limit information. Further, the fourth message may be a handover request message, that is, Handover Request.

In the embodiment shown in FIG. 7, the radio access capability of the terminal device may depend on the static radio access capability and the access capability temporary limit information of the terminal device. When the radio access capability of the terminal device changes as a scenario changes, the terminal device only needs to send the access capability temporary limit information to the access network device, so that signaling overheads between the terminal device and the access network device can be reduced.

It may be understood that the communication method described in the embodiment shown in FIG. 7 is applicable to any scenario in which the radio access capability of the terminal device is determined based on the static radio access capability and the access capability temporary limit information. Optionally, the method in the embodiment shown in FIG. 7 may be independent of other embodiments, or may be combined with the other embodiments.

An embodiment of this application provides an access network device. The access network device may implement functions of the access network device in the method described in the foregoing embodiment of this application.

Figure 9:
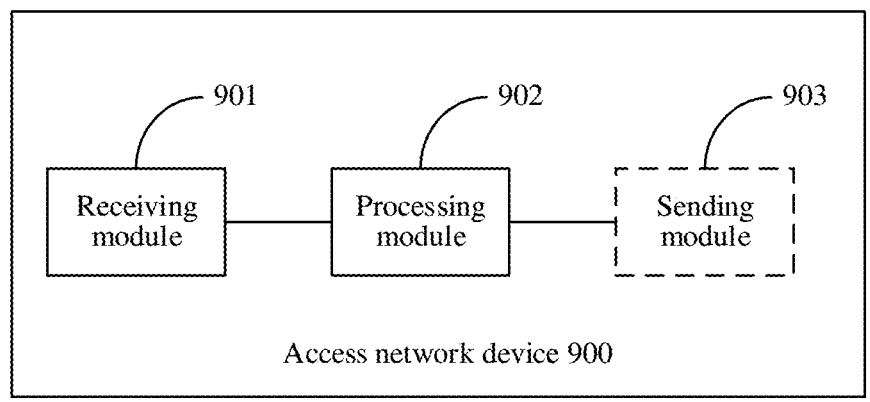
FIG. 9 is a schematic structural diagram of an access network device according to an embodiment of this application.

Optionally, FIG. 9 is a schematic structural diagram of an access network device according to an embodiment of the present invention. As shown in FIG. 9, the access network device 900 includes a receiving module 901, configured to in a radio resource control RRC connection setup procedure, receive first access capability indication information of a terminal device, where the first access capability indication information is used to represent a radio access capability of the terminal device, and a processing module 902, configured to obtain the radio access capability of the terminal device according to the first access capability indication information.

Optionally, the processing module 902 is configured to use a radio access capability that corresponds to the first access capability indication information and that is in a first terminal device access capability set as the radio access capability of the terminal device according to the first access capability indication information.

Optionally, the access network device 900 further includes a sending module 903, configured to when the access network device does not store the radio access capability that corresponds to the first access capability indication information, request the terminal device or a core network device for the radio access capability of the terminal device.

Optionally, the receiving module 901 is further configured to receive terminal device access capability information sent by the terminal device, where the terminal device access capability information includes the radio access capability of the terminal device, and the processing module 902 is further configured to correspondingly add the first access capability indication information of the terminal device and the radio access capability of the terminal device to the first terminal device access capability set.

Optionally, the sending module 903 is configured to send a first message to the core network device, where the first message is used to indicate that the access network device has obtained the radio access capability of the terminal device.

Optionally, the receiving module 901 is further configured to receive a third message from the core network device, and the processing module 902 is further configured to when the third message carries the radio access capability of the terminal device, correspondingly add the first access capability indication information of the terminal device and the radio access capability of the terminal device to the first terminal device access capability set.

Optionally, the sending module 903 is configured to when it is determined to perform access network device handover on the terminal device, send a fourth message carrying the first access capability indication information to a target access network device.

It should be referred to related descriptions of the corresponding access network device in the embodiments shown in FIG. 2a to FIG. 7 for functions and implementations of the functional modules in the access network device 900 described in this embodiment of this application and meanings and obtaining manners of related parameters. Details are not described herein again.

An embodiment of this application provides a terminal device. The terminal device may implement functions of the terminal device in the method described in the foregoing embodiment of this application.

Figure 10:
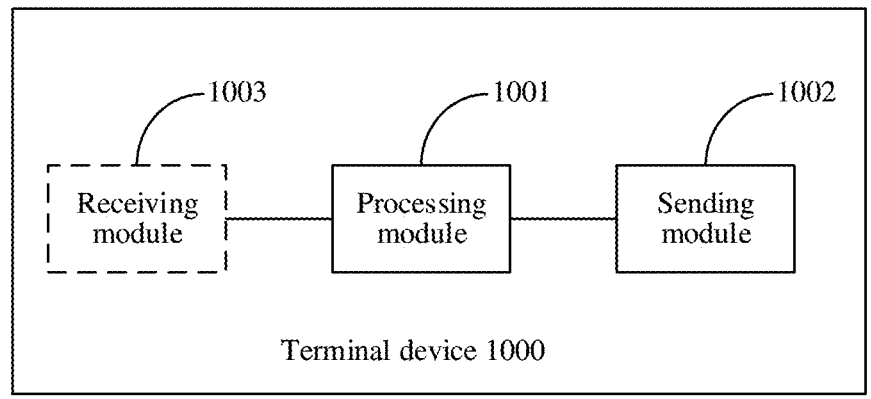
FIG. 10 is a schematic structural diagram of a terminal device according to an embodiment of this application.

Optionally, FIG. 10 is a schematic structural diagram of a terminal device according to an embodiment of the present invention. As shown in FIG. 10, the terminal device woo includes a processing module 1001, configured to obtain first access capability indication information of the terminal device, and a sending module 1002, configured to in a radio resource control RRC connection setup procedure, send the first access capability indication information of the terminal device to an access network device, where the first access capability indication information is used to represent a radio access capability of the terminal device.

Optionally, the terminal device moo further includes a receiving module 1003, configured to when a radio access capability corresponding to the first access capability indication information does not exist in a first terminal device access capability set, receive a terminal device access capability request from the access network device.

It should be referred to related descriptions of the corresponding terminal device in the embodiments shown in FIG. 2a to FIG. 7 for functions and implementations of the functional modules in the terminal device woo described in this embodiment of this application and meanings and obtaining manners of related parameters. Details are not described herein again.

An embodiment of this application provides a core network device. The core network device may implement functions of the core network device in the method described in the foregoing embodiment of this application.

Figure 11:
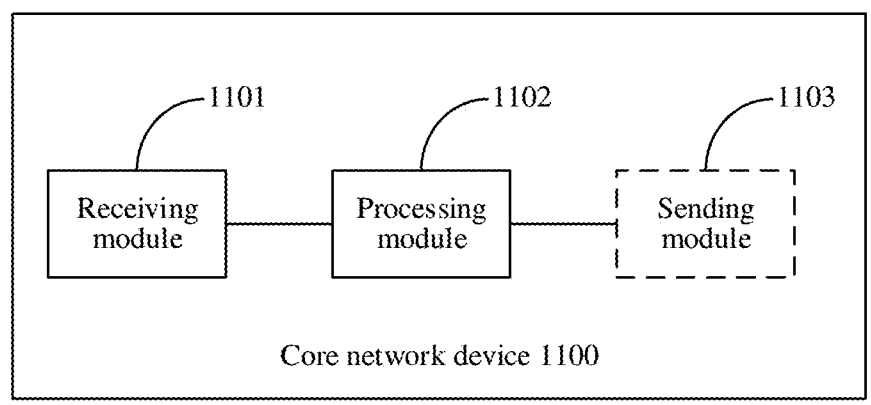
FIG. 11 is a schematic structural diagram of a core network device according to an embodiment of this application.

Optionally, FIG. 11 is a schematic structural diagram of a core network device according to an embodiment of the present invention. As shown in FIG. 11, the core network device 1100 includes a receiving module 1101, configured to receive a second message from an access network device, where the second message carries first access capability indication information of a terminal, and the first access capability indication information is used to represent a radio access capability of the terminal, and a processing module 1102, configured to obtain the radio access capability of the terminal according to the first access capability indication information of the terminal.

Optionally, the processing module 1102 is specifically configured to use a radio access capability that corresponds to the first access capability indication information and that is in a second terminal access capability set as the radio access capability of the terminal according to the first access capability indication information.

The core network device 1100 further includes a sending module 1103, configured to send the obtained radio access capability of the terminal to the access network device.

Optionally, the sending module 1103 is further configured to when the radio access capability corresponding to the first access capability indication information does not exist in the second terminal access capability set, instruct the access network device to request the terminal for the radio access capability of the terminal.

Optionally, the receiving module 1101 is further configured to receive the radio access capability of the terminal from the access network device.

The processing module 1102 is further configured to correspondingly add the first access capability indication information of the terminal and the radio access capability of the terminal to the second terminal access capability set.

It should be referred to related descriptions of the corresponding core network device in the embodiments shown in FIG. 2a to FIG. 7 for functions and implementations of the functional modules in the core network device 1100 described in this embodiment of this application and meanings and obtaining manners of related parameters. Details are not described herein again.

An embodiment of this application provides a network device. The network device may implement functions of the network device in the method described in the foregoing embodiment of this application.

Figure 12:
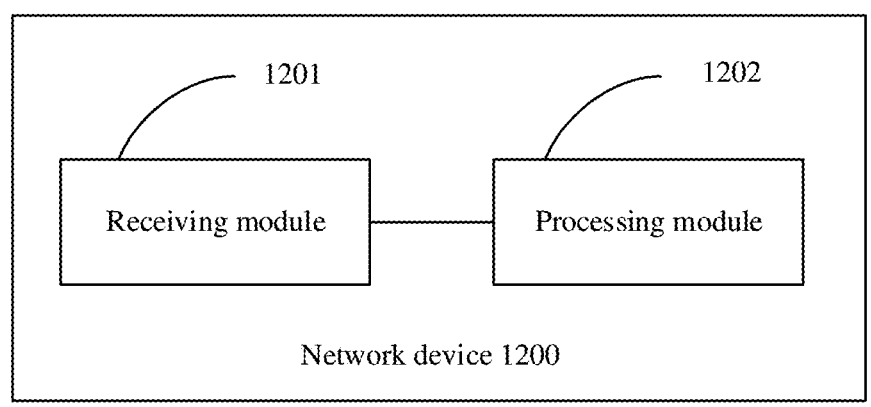
FIG. 12 is a schematic structural diagram of a network device according to an embodiment of this application.

Optionally, FIG. 12 is a schematic structural diagram of a network device according to an embodiment of the present invention. As shown in FIG. 12, the network device 1200 includes a receiving module 1201, configured to receive a radio access capability of a terminal device, and a processing module 1202, configured to detect whether a target radio access capability the same as the received radio access capability of the terminal device exists in a third terminal device access capability set, where the third terminal device access capability set is a set of radio access capability information.

The processing module 1202 is further configured to when the target radio access capability exists in the third terminal device access capability set, index second access capability indication information in a context of the terminal device to the target radio access capability.

Optionally, the processing module 1202 is further configured to when the target radio access capability does not exist in the third terminal device access capability set, add radio access capability information corresponding to the radio access capability of the terminal device to the third terminal device access capability set, and index the second access capability indication information in the context of the terminal device to the added radio access capability information.

Optionally, the processing module 1202 is specifically configured to determine a first access capability that has a byte stream the same as that of the radio access capability of the terminal device and that is in the third terminal device access capability set as the target radio access capability.

It should be referred to related descriptions of the corresponding core network device or access network device in the embodiment shown in FIG. 6 for functions and implementations of the functional modules in the network device 1200 described in this embodiment of this application and meanings and obtaining manners of related parameters. Details are not described herein again.

Figure 13:
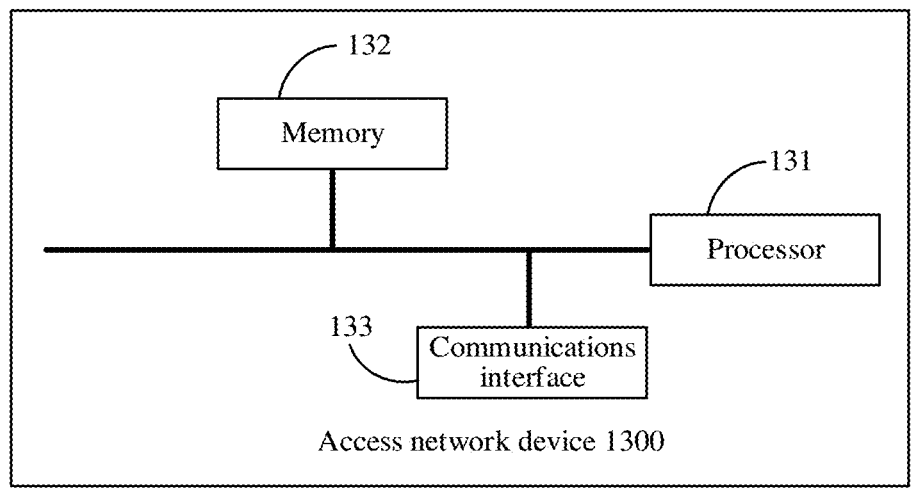
FIG. 13 is a schematic structural diagram of another access network device according to an embodiment of this application.

FIG. 13 is a schematic structural diagram of another access network device according to an embodiment of this application. As shown in FIG. 13, the access network device 1300 includes a processor 131, a memory 132, and a communications interface 133. The processor 131 is connected to the memory 132 and the communications interface 133. For example, the processor 131 may be connected to the memory 132 and the communications interface 133 by using a bus.

The processor 131 is configured to support the access network device in performing corresponding functions in the methods in FIG. 2a to FIG. 7. The processor 131 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 132 is configured to store program code, a radio access capability, and the like. The memory 132 may include a volatile memory, for example, a random access memory (RAM). The memory 132 may also include a non-volatile memory, for example, a read-only memory (ROM), a flash memory), a hard disk drive (HDD), or a solid-state drive (SSD). The memory 132 may also include a combination of memories of the foregoing types.

The communications interface 133 is configured to communicate with another network device in this embodiment of this application.

The processor 131 in the access network device 1300 reads the program code stored in the memory 132, so that the following operations are performed.

The communications interface 133 is configured to in a radio resource control RRC connection setup procedure, receive first access capability indication information of a terminal device, where the first access capability indication information is used to represent a radio access capability of the terminal device.

The processor 131 is configured to obtain the radio access capability of the terminal device according to the first access capability indication information.

Optionally, the processor 131 is specifically configured to use a radio access capability that corresponds to the first access capability indication information and that is in a first terminal device access capability set as the radio access capability of the terminal device according to the first access capability indication information.

Optionally, the communications interface 133 is further configured to when the access network device does not store the radio access capability that corresponds to the first access capability indication information, request the terminal device or a core network device for the radio access capability of the terminal device.

Optionally, the communications interface 133 is further configured to receive terminal device access capability information sent by the terminal device, where the terminal device access capability information includes the radio access capability of the terminal device.

The processor 131 is further configured to correspondingly add the first access capability indication information of the terminal device and the radio access capability of the terminal device to the first terminal device access capability set.

Optionally, the communications interface 133 is further configured to send a first message to the core network device, where the first message is used to indicate that the access network device has obtained the radio access capability of the terminal device.

Optionally, the communications interface 133 is further configured to receive a third message from the core network device.

The processor 131 is further configured to when the third message carries the radio access capability of the terminal device, correspondingly add the first access capability indication information of the terminal device and the radio access capability of the terminal device to the first terminal device access capability set.

Optionally, the communications interface 133 is further configured to when it is determined to perform access network device handover on the terminal device, send a fourth message carrying the first access capability indication information to a target access network device.

It should be referred to related descriptions of the corresponding access network device in the embodiments shown in FIG. 2a to FIG. 7 for functions of the functional modules in the access network device 1300. Details are not described herein again. Optionally, the processor 131 may be configured to implement the function of the processing module 902, and the communications interface 133 may be configured to implement the functions of one or more modules in the receiving module 901 or the sending module 903. In the several embodiments provided in this application, it should be understood that the disclosed apparatus and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

Figure 14:
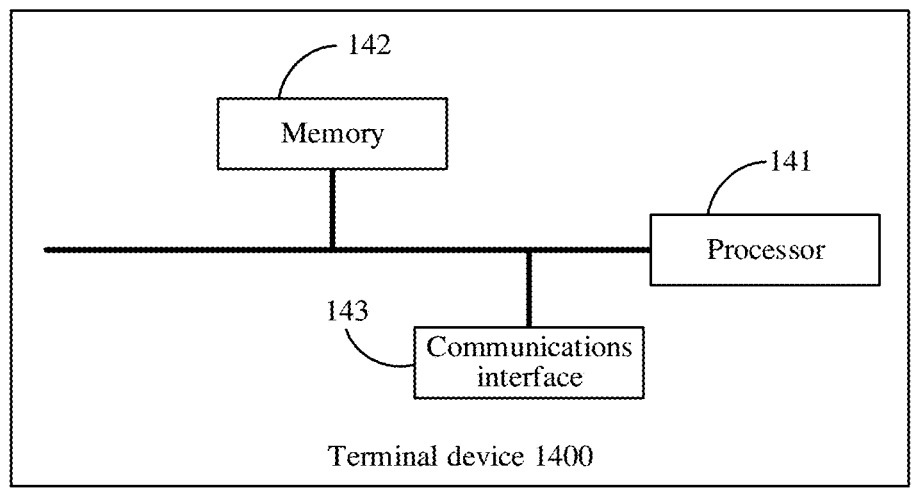
FIG. 14 is a schematic structural diagram of another terminal device according to an embodiment of this application.

FIG. 14 is a schematic structural diagram of another terminal device according to an embodiment of this application. As shown in FIG. 14, the terminal device 1400 includes a processor 141, a memory 142, and a communications interface 143. The processor 141 is connected to the memory 142 and the communications interface 143. For example, the processor 141 may be connected to the memory 142 and the communications interface 143 by using a bus.

The processor 141 is configured to support the terminal device in performing corresponding functions in the methods in FIG. 2a to FIG. 7. The processor 141 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 142 is configured to store program code, a radio access capability, and the like. The memory 142 may include a volatile memory, for example, a random access memory (RAM). The memory 142 may also include a non-volatile memory, for example, a read-only memory (ROM), a flash memory, a hard disk drive (HDD), or a solid-state drive (SSD). The memory 142 may also include a combination of memories of the foregoing types.

The communications interface 143 is configured to communicate with another network device in this embodiment of this application.

The processor 141 in the terminal device 1400 reads the program code stored in the memory 142, so that the following operations are performed.

The processor 141 is configured to obtain first access capability indication information of the terminal device.

The communications interface 143 is configured to in a radio resource control RRC connection setup procedure, send the first access capability indication information of the terminal device to an access network device, where the first access capability indication information is used to represent a radio access capability of the terminal device.

Optionally, the communications interface 143 is further configured to when a radio access capability corresponding to the first access capability indication information does not exist in a first terminal device access capability set, receive a terminal device access capability request from the access network device.

It should be referred to related descriptions of the corresponding terminal device in the embodiments shown in FIG. 2a to FIG. 7 for functions of the functional modules in the terminal device 1400. Details are not described herein again. Optionally, the processor 141 may be configured to implement the function of the processing module 1001, and the communications interface 143 may be configured to implement the functions of one or more modules in the receiving module 1003 or the sending module 1002. In the several embodiments provided in this application, it should be understood that the disclosed apparatus and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

Figure 15:
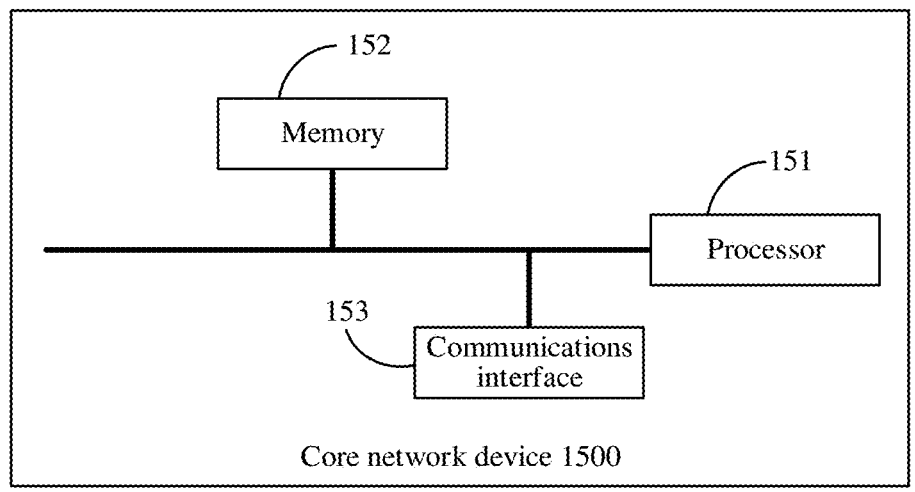
FIG. 15 is a schematic structural diagram of another core network device according to an embodiment of this application.

FIG. 15 is a schematic structural diagram of another core network device according to an embodiment of this application. As shown in FIG. 15, the core network device 1500 includes a processor 151, a memory 152, and a communications interface 153. The processor 151 is connected to the memory 152 and the communications interface 153. For example, the processor 151 may be connected to the memory 152 and the communications interface 153 by using a bus.

The processor 151 is configured to support the core network device in performing corresponding functions in the methods in FIG. 2a to FIG. 7. The processor 151 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 152 is configured to store program code, a radio access capability, and the like. The memory 152 may include a volatile memory, for example, a random access memory (RAM). The memory 152 may also include a non-volatile memory, for example, a read-only memory (ROM), a flash memory, a hard disk drive (HDD), or a solid-state drive (SSD). The memory 152 may also include a combination of memories of the foregoing types.

The communications interface 153 is configured to communicate with another network device in this embodiment of this application.

The processor 151 in the core network device 1500 reads the program code stored in the memory 152, so that the following operations are performed.

The communications interface 153 is configured to receive a second message from an access network device, where the second message carries first access capability indication information of a terminal, and the first access capability indication information is used to represent a radio access capability of the terminal.

The processor 151 is configured to obtain the radio access capability of the terminal according to the first access capability indication information of the terminal.

Optionally, the communications interface 153 is specifically configured to use a radio access capability that corresponds to the first access capability indication information and that is in a second terminal access capability set as the radio access capability of the terminal according to the first access capability indication information.

The communications interface 153 is further configured to send the obtained radio access capability of the terminal to the access network device.

Optionally, the communications interface 153 is further configured to
when the radio access capability corresponding to the first access capability indication information does not exist in the second terminal access capability set, instruct the access network device to request the terminal for the radio access capability of the terminal.

Optionally, the communications interface 153 is further configured to receive the radio access capability of the terminal from the access network device.

The processor 151 is further configured to correspondingly add the first access capability indication information of the terminal and the radio access capability of the terminal to the second terminal access capability set.

It should be referred to related descriptions of the corresponding core network device in the embodiments shown in FIG. 2a to FIG. 7 for functions of the functional modules in the core network device 1500. Details are not described herein again. Optionally, the processor 151 may be configured to implement the function of the processing module 1102, and the communications interface 153 may be configured to implement the functions of one or more modules in the receiving module 1101 or the sending module 1103.

In the several embodiments provided in this application, it should be understood that the disclosed apparatus and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

Figure 16:
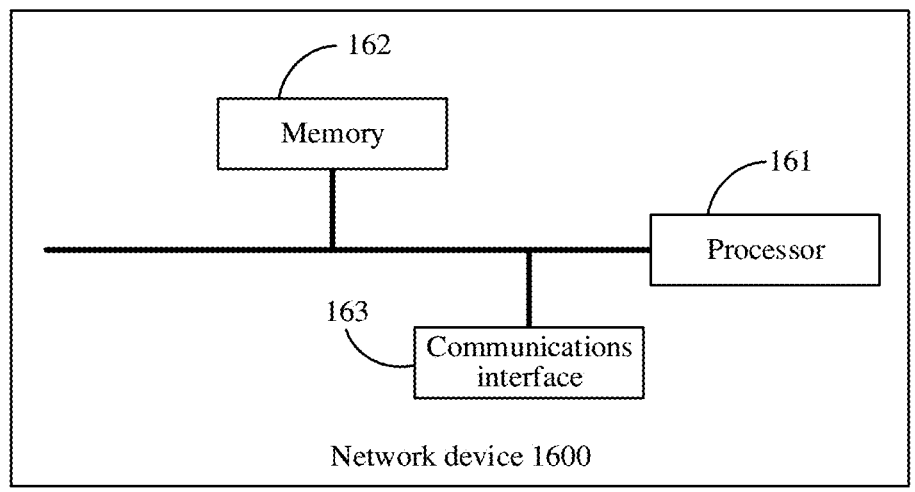
FIG. 16 is a schematic structural diagram of another network device according to an embodiment of this application.

FIG. 16 is a schematic structural diagram of another network device according to an embodiment of this application. As shown in FIG. 16, the network device 1600 includes a processor 161, a memory 162, and a communications interface 163. The processor 161 is connected to the memory 162 and the communications interface 163. For example, the processor 161 may be connected to the memory 162 and the communications interface 163 by using a bus.

The processor 161 is configured to support the network device in performing corresponding functions in the method in FIG. 6. The processor 161 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 162 is configured to store program code, a radio access capability, and the like. The memory 162 may include a volatile memory (volatile memory), for example, a random access memory (RAM). The memory 162 may also include a non-volatile memory, for example, a read-only memory (ROM), a flash memory, a hard disk drive (HDD), or a solid-state drive (SSD). The memory 162 may also include a combination of memories of the foregoing types.

The communications interface 163 is configured to communicate with another network device in this embodiment of this application.

The processor 161 in the network device 1600 reads the program code stored in the memory 162, so that the following operations are performed.

The communications interface 163 is configured to receive a radio access capability of a terminal device.

The processor 161 is configured to detect whether a target radio access capability the same as the received radio access capability of the terminal device exists in a third terminal device access capability set, where the third terminal device access capability set is a set of radio access capability information.

The processor 161 is further configured to when the target radio access capability exists in the third terminal device access capability set, index second access capability indication information in a context of the terminal device to the target radio access capability.

Optionally, the processor 161 is further configured to when the target radio access capability does not exist in the third terminal device access capability set, add radio access capability information corresponding to the radio access capability of the terminal device to the third terminal device access capability set, and index the second access capability indication information in the context of the terminal device to the added radio access capability information.

Optionally, the processor 161 is specifically configured to determine a first access capability that has a byte stream the same as that of the radio access capability of the terminal device and that is in the third terminal device access capability set as the target radio access capability.

It should be referred to related descriptions of the corresponding core network device or access network device in the embodiment shown in FIG. 6 for functions of the functional modules in the network device 1600. Details are not described herein again. Optionally, the processor 161 may be configured to implement the function of the processing module 1202, and the communications interface 163 may be configured to implement the function of the receiving module 1201. In the several embodiments provided in this application, it should be understood that the disclosed apparatus and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

Persons of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a read-only memory (Read-Only Memory, ROM), or a random access memory (Random Access Memory, RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A communication method, comprising:
  receiving, by a core network device, a radio access capability of a terminal device from a first access network device;
  searching, by the core network device, in a terminal device access capability set, for the radio access capability of the terminal device; and
  determining, by the core network device, that the radio access capability of the terminal does not exist in the terminal device access capability set;
  setting, by the core network device, a radio access capability identifier corresponding to the radio access capability of the terminal device, wherein the radio access capability identifier is of a public land mobile network (PLMN) level; and
  sending, by the core network device, to the first access network device, the radio access capability identifier.

2. The method according to claim 1, further comprising:
  adding, by the core network device, the radio access capability identifier and the radio access capability of the terminal device to the terminal device access capability set.

3. An apparatus, comprising:
  at least one processor; and
  a non-transitory memory coupled to the at least one processor and having a program stored thereon for execution by the at least one processor, the program including instructions to:
    receive a radio access capability of a terminal from a first access network device; and
    search, in a terminal device access capability set, for the radio access capability of the terminal device; and determine that the radio access capability of the terminal device does not exist in the terminal device access capability set;
set a radio access capability identifier corresponding to the radio access capability of the terminal device, wherein the radio access capability identifier is of a public land mobile network (PLMN) level; and
send the radio access capability identifier to the first access network device.

4. The apparatus according to claim 3, wherein the program further includes instructions to:
add the radio access capability identifier and the radio access capability of the terminal device to the terminal device access capability set.

5. A communication system, comprising
a core network device, comprising:
at least one first processor; and
one or more non-transitory first memories storing first programming instructions executable by the at least one first processor to:
receive a radio access capability of a terminal from a first access network device; and
search, in a terminal device access capability set, for the radio access capability of the terminal device; and
determine that the radio access capability of the terminal device does not exist in the terminal device access capability set;
set a radio access capability identifier corresponding to the radio access capability of the terminal device, wherein the radio access capability identifier is of a public land mobile network (PLMN) level; and
send the radio access capability identifier to the first access network device; and
the first access network device, comprising:
at least one second processor; and
one or more non-transitory second memories storing second programming instructions executable by the at least one second processor to:
send the radio access capability of the terminal to the core network device; and
receive the radio access capability identifier corresponding to the radio access capability of the terminal device from the core network device.

6. The communication system according to claim 5, wherein the first programming instructions are further executable by the at least one first processor to:
add the radio access capability identifier and the radio access capability of the terminal device to the terminal device access capability set.

* * * * *

UNITED STATES PATENT AND TRADEMARK OFFICE
CERTIFICATE OF CORRECTION

| | |
|---|---|
| PATENT NO. | : 11,363,648 B2 |
| APPLICATION NO. | : 16/673636 |
| DATED | : June 14, 2022 |
| INVENTOR(S) | : Hongping Zhang et al. |

It is certified that error appears in the above-identified patent and that said Letters Patent is hereby corrected as shown below:

In the Specification

In the Detailed Description of Illustrative Embodiments, Column 22, Line 44; delete "corresponding to" and insert --consistent with--.

Signed and Sealed this
Nineteenth Day of July, 2022

Katherine Kelly Vidal
*Director of the United States Patent and Trademark Office*